(12) United States Patent
Ohta

(10) Patent No.: US 9,751,707 B2
(45) Date of Patent: Sep. 5, 2017

(54) CARD CONVEYING MECHANISM AND CARD ISSUING DEVICE

(71) Applicant: NIDEC SANKYO CORPORATION, Suwa-gun, Nagano (JP)

(72) Inventor: Keiji Ohta, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 15/127,149

(22) PCT Filed: Mar. 5, 2015

(86) PCT No.: PCT/JP2015/056479
§ 371 (c)(1),
(2) Date: Sep. 19, 2016

(87) PCT Pub. No.: WO2015/141479
PCT Pub. Date: Sep. 24, 2015

(65) Prior Publication Data
US 2017/0107069 A1    Apr. 20, 2017

(30) Foreign Application Priority Data

Mar. 18, 2014 (JP) .................................. 2014-055245

(51) Int. Cl.
*B65H 5/04* (2006.01)
*G06K 13/063* (2006.01)
(Continued)

(52) U.S. Cl.
CPC .............. *B65H 5/04* (2013.01); *B65H 5/062* (2013.01); *B65H 29/125* (2013.01); *B65H 29/58* (2013.01);
(Continued)

(58) Field of Classification Search
CPC ........ B65H 5/04; B65H 5/062; B65H 29/125; B65H 29/58; B65H 2701/1914;
(Continued)

(56) References Cited

U.S. PATENT DOCUMENTS 5,771,058 A * 6/1998 Kobayashi ............... B41J 13/12
271/186
2007/0023992 A1* 2/2007 Ohta ......................... B65H 1/06
271/181

(Continued)

FOREIGN PATENT DOCUMENTS

JP     H09131930 A    5/1997
JP     2000251018 A   9/2000
(Continued)

OTHER PUBLICATIONS

International Search Report corresponding to Application No. PCT/JP2015/056479; Date of Mailing: May 12, 2015, with English translation.

*Primary Examiner* — David H Bollinger
(74) *Attorney, Agent, or Firm* — Cantor Colburn LLP

(57) ABSTRACT

The purpose of the present invention is to provide a card conveying mechanism capable of conveying a card in a horizontal direction and allowing for less space in a higher-level apparatus to be taken up even if the card conveying mechanism is capable of making the card parallel to the horizontal direction or tilting the card relative to the horizontal direction. The card conveying mechanism is provided with a card holder that has a draw and feed mechanism for drawing and feeding a card and temporarily holds the card therein, a draw and feed driving mechanism for driving the draw and feed mechanism, a carriage where the card holder is mounted, a carriage driving mechanism for moving the carriage linearly in a horizontal direction perpendicular to a direction in which the card is drawn into the card holder and (Continued)

a rotating mechanism for rotating the card holder with respect to the carriage around an axis in which the carriage moves.

22 Claims, 9 Drawing Sheets

(51) Int. Cl.
    *B65H 29/12*     (2006.01)
    *G06K 13/08*     (2006.01)
    *B65H 29/58*     (2006.01)
    *B65H 5/06*     (2006.01)

(52) U.S. Cl.
    CPC ........... *G06K 13/063* (2013.01); *G06K 13/08* (2013.01); *G06K 13/0831* (2013.01); *B65H 2404/142* (2013.01); *B65H 2404/1421* (2013.01); *B65H 2701/1914* (2013.01)

(58) Field of Classification Search
    CPC ...... B65H 2404/142; B65H 2404/1421; G06K 13/063; G06K 13/08; G06K 13/0831
    See application file for complete search history.

(56) References Cited

U.S. PATENT DOCUMENTS

| | | | |
|---|---|---|---|
| 2014/0312117 A1* | 10/2014 | Neubauer | G06K 13/08 235/449 |
| 2014/0346228 A1* | 11/2014 | Ishikawa | G11B 5/00808 235/440 |
| 2015/0060546 A1* | 3/2015 | Ishikawa | G06K 13/0881 235/440 |

FOREIGN PATENT DOCUMENTS

| | | |
|---|---|---|
| JP | 2007041635 A | 2/2007 |
| JP | 201416849 A | 1/2014 |

* cited by examiner

CARD CONVEYING MECHANISM AND CARD ISSUING DEVICE

CROSS REFERENCE TO RELATED APPLICATIONS

This is the U.S. national stage of application No. PCT/JP2015/056479, filed on Mar. 5, 2015. Priority under 35 U.S.C. §119(a) and 35 U.S.C. §365(b) is claimed from Japanese Application No. 2014-055245, filed Mar. 18, 2014, the disclosure of which is incorporated herein by reference.

TECHNICAL FIELD

At least an embodiment of the present invention relates to a card conveying mechanism structured to convey a card. Further, at least an embodiment of the present invention relates to a card issuing device which includes the card conveying mechanism.

BACKGROUND

Conventionally, a card issuing device structured to issue a card in which predetermined information is recorded has been known (see, for example, Patent Literature 1). The card issuing device described in Patent Literature 1 includes a card reader part structured to perform reproduction and the like of information recorded in a card, a plurality of card stack parts in which cards before issue are stacked and accommodated, a card turning part in which a card is turned, and a card conveyance part structured to convey a card between the card reader part, the plurality of the card stack parts and the card turning part. The card reader part, the plurality of the card stack parts, the card turning part and the card conveyance part are placed on a main body base.

Further, in the card issuing device described in Patent Literature 1, the card conveyance part includes a carriage which is linearly moved in a horizontal direction, and a drawing mechanism structured to draw a card into an inside of the carriage and to send out the card from the inside of the carriage. The carriage is movable in a short-side direction (width direction) of a card formed in a substantially rectangular shape. The card turning part includes a drive roller, a driven roller which is oppositely disposed to the drive roller, and an attaching member to which the drive roller and the driven roller are rotatably attached. Further, the card turning part includes a drive mechanism structured to drive the drive roller and a turning mechanism structured to turn the attaching member.

PATENT LITERATURE

[PTL 1] Japanese Patent Laid-Open No. 2007-41635

The card issuing device described in Patent Literature 1 includes the card conveyance part and thus a card can be conveyed in a horizontal direction (specifically, in a short-side direction of a card). Further, since the card issuing device includes the card turning part, a longitudinal direction of a card can be inclined with respect to the horizontal direction by utilizing the card turning part and, therefore, various processes can be performed on the card. However, in the card issuing device, the card conveyance part having the carriage and the card turning part having the attaching member are separately provided and placed on the main body base and thus an area of the main body base is large and, as a result, installation area of the card issuing device becomes wide.

SUMMARY

Therefore, in view of the problem described above, at least an embodiment of the present invention provides a card conveying mechanism capable of reducing an installation area of a host apparatus to which the card conveying mechanism is mounted even when a card is capable of being conveyed in a horizontal direction, a card is capable of being set in parallel to the horizontal direction, and a card is capable of being inclined with respect to the horizontal direction. Further, at least an embodiment of the present invention provides a card issuing device including the card conveying mechanism.

To achieve the above, at least an embodiment of the present invention provides a card conveying mechanism including a card holding part having a drawing and sending-out mechanism structured to perform drawing and sending out a card, the card holding part being configured to temporarily hold the card in its inside, a drawing and sending-out drive mechanism structured to drive the drawing and sending-out mechanism, a carriage on which the card holding part is mounted, a carriage drive mechanism structured to linearly move the carriage in a horizontal direction which is perpendicular to a drawing direction of the card into the card holding part, and a turning mechanism structured to turn the card holding part with respect to the carriage with the moving direction of the carriage as an axial direction of turning.

The card conveying mechanism in at least an embodiment of the present invention includes a carriage drive mechanism structured to linearly move the carriage on which the card holding part is mounted in a horizontal direction and a turning mechanism structured to turn the card holding part with respect to the carriage with the moving direction of the carriage as an axial direction of turning. Therefore, according to at least an embodiment of the present invention, a card held by the card holding part is capable of being conveyed in the horizontal direction, and a card held by the card holding part is capable of being set in parallel to the horizontal direction and being inclined with respect to the horizontal direction. Further, in at least an embodiment of the present invention, the card holding part mounted on the carriage is linearly moved in the horizontal direction and is turned with the moving direction of the carriage as an axial direction of turning. Therefore, in comparison with a case that a card holding part linearly moved in the horizontal direction and a card holding part turned with the moving direction of the carriage as an axial direction of turning are separately provided from each other, the size of the card conveying mechanism can be made small and an installation area of the card conveying mechanism can be reduced. Accordingly, in at least an embodiment of the present invention, even when a card can be conveyed in the horizontal direction and a card can be set in parallel to the horizontal direction or inclined with respect to the horizontal direction, an installation area of a host apparatus on which the card conveying mechanism is mounted can be reduced.

In at least an embodiment of the present invention, it is preferable that the card conveying mechanism includes two or more card holding parts which are disposed so as to overlap with each other in an upper and lower direction and, when the card holding parts are turned to predetermined positions by the turning mechanism, the card is capable of being transferred between the card holding parts in the upper and lower direction. According to this structure, a card is capable of being conveyed in an upper and lower direction.

In at least an embodiment of the present invention, it is preferable that two or more card holding parts are mounted on a common carriage so as to overlap in the upper and lower direction. According to this structure, in comparison with a case that carriages on which each of two or more card holding parts is mounted are individually provided, the structure of the card conveying mechanism can be simplified.

In at least an embodiment of the present invention, it is preferable that the card conveying mechanism includes a first card holding part and a second card holding part as the card holding part, the turning mechanism includes one turning motor which is a drive source and, when the turning motor is rotated, the first card holding part and the second card holding part are turned together. According to this structure, the first card holding part and the second card holding part can be turned by one turning motor and thus the structure of the turning mechanism can be simplified. Further, according to this structure, alignment of the first card holding part with the second card holding part can be performed by controlling the one turning motor when a card is transferred between the first card holding part and the second card holding part in the upper and lower direction. Therefore, the card conveying mechanism is easily controlled when a card is conveyed in the upper and lower direction.

In at least an embodiment of the present invention, for example, the turning mechanism includes a first turning pulley which is fixed to a turnable shaft fixed to the first card holding part, a second turning pulley which is fixed to a turnable shaft fixed to the second card holding part, and a turning belt which is stretched over the first turning pulley and the second turning pulley. When the turning motor is rotated, the turning belt is turned and thereby the first card holding part and the second card holding part are turned together.

In at least an embodiment of the present invention, it is preferable that the card conveying mechanism includes, as the card holding part, a first card holding part and a second card holding part, the first card holding part includes a first drawing and sending-out mechanism as the drawing and sending-out mechanism, and the second card holding part includes a second drawing and sending-out mechanism as the drawing and sending-out mechanism. The drawing and sending-out drive mechanism includes one drawing and sending-out motor which is a drive source and, when the drawing and sending-out motor is rotated, the first drawing and sending-out mechanism and the second drawing and sending-out mechanism perform a drawing operation or a sending-out operation of the card. According to this structure, a drawing operation or a sending-out operation of the card can be performed by the first drawing and sending-out mechanism and the second drawing and sending-out mechanism by using the one drawing and sending-out motor and thus a structure of the drawing and sending-out drive mechanism can be simplified. Further, according to this structure, a sending-out operation of a card by the first drawing and sending-out mechanism and a drawing operation of the card by the second drawing and sending-out mechanism can be easily synchronized with each other, and a sending-out operation of a card by the second drawing and sending-out mechanism and a drawing operation of the card by the first drawing and sending-out mechanism can be easily synchronized with each other. Therefore, when performing transfer of a card between the first card holding part and the second card holding part in the upper and lower direction, a card can be easily and smoothly transferred between the first card holding part and the second card holding part.

In at least an embodiment of the present invention, for example, the drawing and sending-out drive mechanism includes a first drawing and sending-out pulley with which the first drawing and sending-out mechanism is connected, a second drawing and sending-out pulley with which the second drawing and sending-out mechanism is connected, and a drawing and sending-out belt which is stretched over the first drawing and sending-out pulley and the second drawing and sending-out pulley. When the drawing and sending-out motor is rotated, the drawing and sending-out belt is turned and thereby the first drawing and sending-out mechanism and the second drawing and sending-out mechanism perform the drawing operation or the sending-out operation of the card.

In at least an embodiment of the present invention, it is preferable that the drawing and sending-out drive mechanism includes a first gear which is coaxially disposed with the first drawing and sending-out pulley and is rotated together with the first drawing and sending-out pulley, a first gear train which is disposed between the first gear and the first drawing and sending-out mechanism and is engaged with the first gear in a transmission path of power from the drawing and sending-out motor to the first drawing and sending-out mechanism, a second gear which is coaxially disposed with the second drawing and sending-out pulley and is rotated together with the second drawing and sending-out pulley, and a second gear train which is disposed between the second gear and the second drawing and sending-out mechanism and is engaged with the second gear in a transmission path of power from the drawing and sending-out motor to the second drawing and sending-out mechanism. The turning mechanism includes one turning motor which is a drive source, a first turning pulley which is fixed to a turnable shaft fixed to the first card holding part, a second turning pulley which is fixed to a turnable shaft fixed to the second card holding part, and a turning belt which is stretched over the first turning pulley and the second turning pulley. When the turning motor is rotated, the turning belt is turned and thereby the first card holding part and the second card holding part are turned together. The first drawing and sending-out pulley and the first turning pulley are coaxially disposed with each other, and the second drawing and sending-out pulley and the second turning pulley are coaxially disposed with each other. When one of the moving direction of the carriage is referred to as a first direction, the first drawing and sending-out pulley, the second drawing and sending-out pulley, the drawing and sending-out belt, the first gear, the first gear train, the second gear, the second gear train, the first turning pulley, the second turning pulley and the turning belt are disposed on the first direction side with respect to the first card holding part and the second card holding part in the moving direction of the carriage. Gears structuring the first gear train are rotatably held by the first card holding part, gears structuring the second gear train are rotatably held by the second card holding part and, when viewed in the moving direction of the carriage, the first card holding part and the second card holding part are point-symmetrically disposed and the first gear train and the second gear train are point-symmetrically disposed with respect to a midpoint of an imaginary line obtained by connecting a turning center of the first card holding part with a turning center of the second card holding part.

According to this structure, the first drawing and sending-out pulley, the second drawing and sending-out pulley, the drawing and sending-out belt, the first gear, the first gear train, the second gear, the second gear train, the first turning pulley, the second turning pulley and the turning belt are disposed on the first direction side with respect to the first card holding part and the second card holding part in the moving direction of the carriage. Therefore, for example, in comparison with a case that the first drawing and sending-out pulley, the second drawing and sending-out pulley, the drawing and sending-out belt, the first gear, the first gear train, the second gear and the second gear train are disposed on the first direction side with respect to the first card holding part and the second card holding part in the moving direction of carriage, and that the first turning pulley, the second turning pulley and the turning belt are disposed on an opposite side in the first direction with respect to the first card holding part and the second card holding part in the moving direction of carriage, maintenance of the card conveying mechanism can be performed easily.

Further, according to this structure, when viewed in the moving direction of the carriage, the first card holding part and the second card holding part are point-symmetrically disposed and the first gear train and the second gear train are point-symmetrically disposed with respect to the midpoint of an imaginary line obtained by connecting the turning center of the first turning pulley with the turning center of the second turning pulley. Therefore, even when the first drawing and sending-out pulley, the second drawing and sending-out pulley, the drawing and sending-out belt, the first gear, the first gear train, the second gear, the second gear train, the first turning pulley, the second turning pulley and the turning belt are disposed on the first direction side with respect to the first card holding part and the second card holding part in the moving direction of the carriage and, even when the first card holding part to which the first gear train is attached and the second card holding part to which the second gear train is attached are formed in the same shape as each other, an interference of the first gear train and the second gear train with the turning belt can be prevented when the first card holding part and the second card holding part are turned.

In at least an embodiment of the present invention, it is preferable that the card conveying mechanism includes a guide shaft which guides the carriage in the moving direction of the carriage and a support frame which supports both end sides of the guide shaft. The drawing and sending-out drive mechanism includes a drawing and sending-out motor which is fixed to the support frame, a drawing and sending-out power transmission shaft formed in a polygonal-column shape whose both end sides in the moving direction of the carriage are rotatably supported by the support frame, a first drawing and sending-out power transmission mechanism structured to transmit power of the drawing and sending-out motor to the drawing and sending-out power transmission shaft to rotate the drawing and sending-out power transmission shaft, and a second drawing and sending-out power transmission mechanism structured to transmit power transmitted to the drawing and sending-out power transmission shaft to the drawing and sending-out mechanism. The turning mechanism includes a turning motor which is fixed to the support frame, a turning power transmission shaft formed in a polygonal-column shape whose both end sides in the moving direction of the carriage are rotatably supported by the support frame, a first turning power transmission mechanism structured to transmit power of the turning motor to the turning power transmission shaft to rotate the turning power transmission shaft, and a second turning power transmission mechanism structured to transmit power transmitted to the turning power transmission shaft to the card holding part.

According to this structure, the drawing and sending-out motor and the turning motor are fixed to the support frame and the drawing and sending-out motor and the turning motor are not mounted on the carriage. Therefore, cables for supplying electric power to the drawing and sending-out motor and the turning motor and controlling the drawing and sending-out motor and the turning motor are not required to be led out from the carriage. Accordingly, leading-around processing of a cable connected with the drawing and sending-out motor and leading-around processing of a cable connected with the turning motor can be performed easily.

In at least an embodiment of the present invention, it is preferable that the card conveying mechanism includes, as the guide shaft, a first guide shaft which is supported in an upper end side portion of the support frame and a second guide shaft supported in a lower end side portion of the support frame. When a direction perpendicular to the moving direction of the carriage and an upper and lower direction is referred to as a second direction, the first guide shaft is supported in a portion on one side in the second direction of the support frame, one of the drawing and sending-out power transmission shaft and the turning power transmission shaft is rotatably supported in a lower end side portion of the support frame, and the other of the drawing and sending-out power transmission shaft and the turning power transmission shaft is rotatably supported in a portion of the support frame on an upper end side and one side in the second direction. According to this structure, the other of the drawing and sending-out power transmission shaft and the turning power transmission shaft and the first guide shaft which are supported on the upper end side of the support frame are disposed on the one side in the second direction. Therefore, for example, even in a case that the card conveying mechanism is mounted on a card issuing device and card processing parts for processing a card are disposed around the card conveying mechanism, when performing maintenance of the card conveying mechanism and the card processing parts, an operator can easily put his/her hand in toward a lower end side of the card conveying mechanism from an upper side of the card conveying mechanism. Accordingly, maintenance of the card conveying mechanism and the card processing parts can be performed easily.

The card conveying mechanism in at least an embodiment of the present invention may be used in a card issuing device including a card accommodation part in which cards before issue are accommodated and a card taking-out part for taking out the card to be issued. According to the card issuing device, even when a card can be conveyed in a horizontal direction and a card can be set in parallel to the horizontal direction or inclined with respect to the horizontal direction, an installation area of the card conveying mechanism can be reduced and thus an installation area of the card issuing device can be reduced. Further, in the card issuing device, the card holding part can be turned with respect to the carriage while linearly moving the carriage in the horizontal direction and thus time required to perform processing of issue of a card can be shortened.

As describe above, in at least an embodiment of the present invention, even when a card can be conveyed in a horizontal direction and a card can be set in parallel to the horizontal direction or inclined with respect to the horizontal direction, an installation area of a host apparatus such as a card issuing device on which the card conveying mechanism is mounted can be reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Entire Structure of Card Issuing Device)

Figure 1:
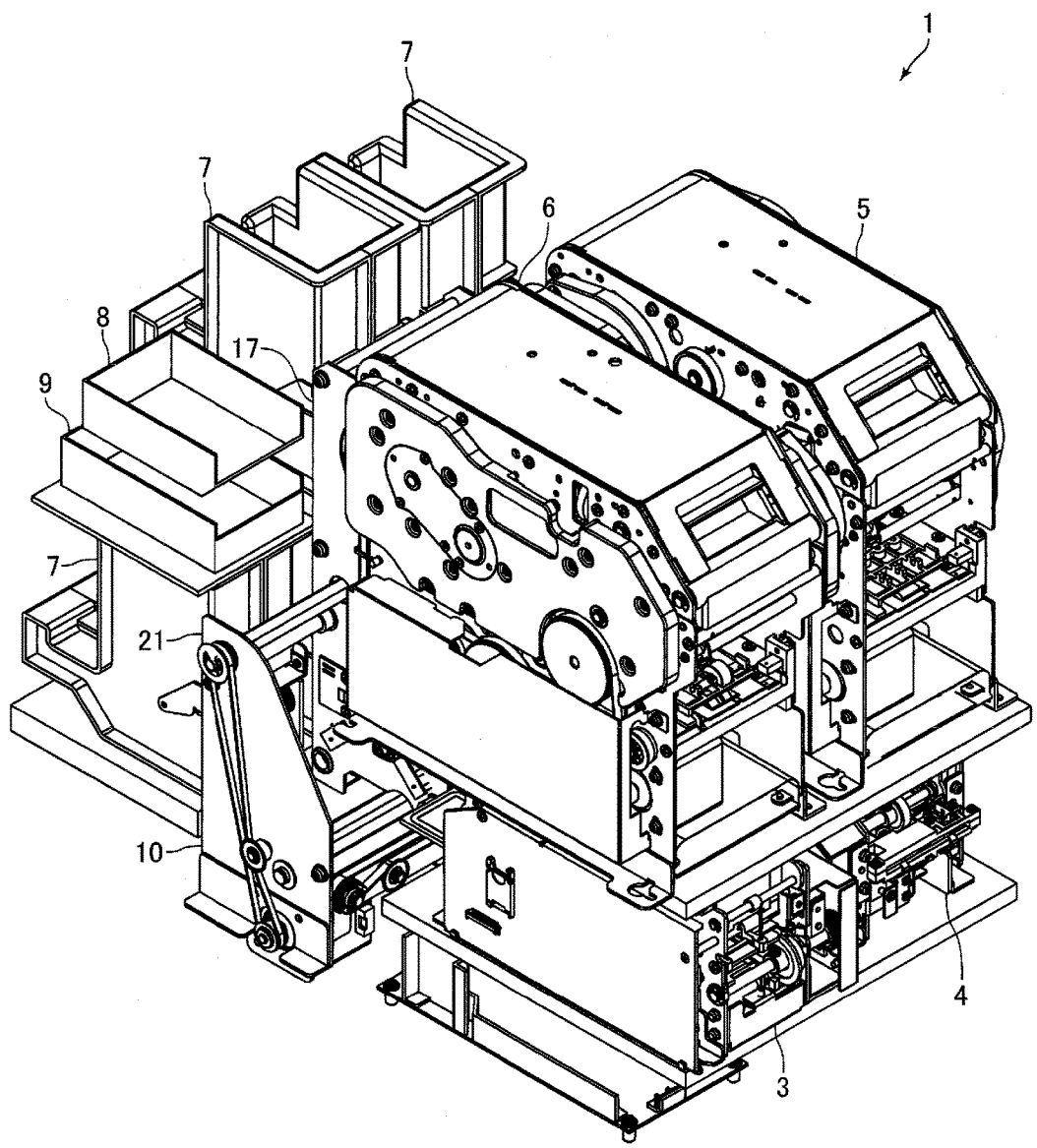
FIG. 1 is a perspective view showing a card issuing device in accordance with an embodiment of the present invention.
Figure 1:
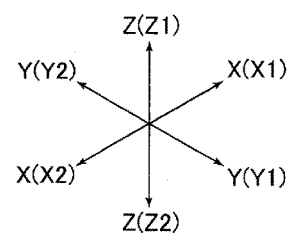
Figure 2:
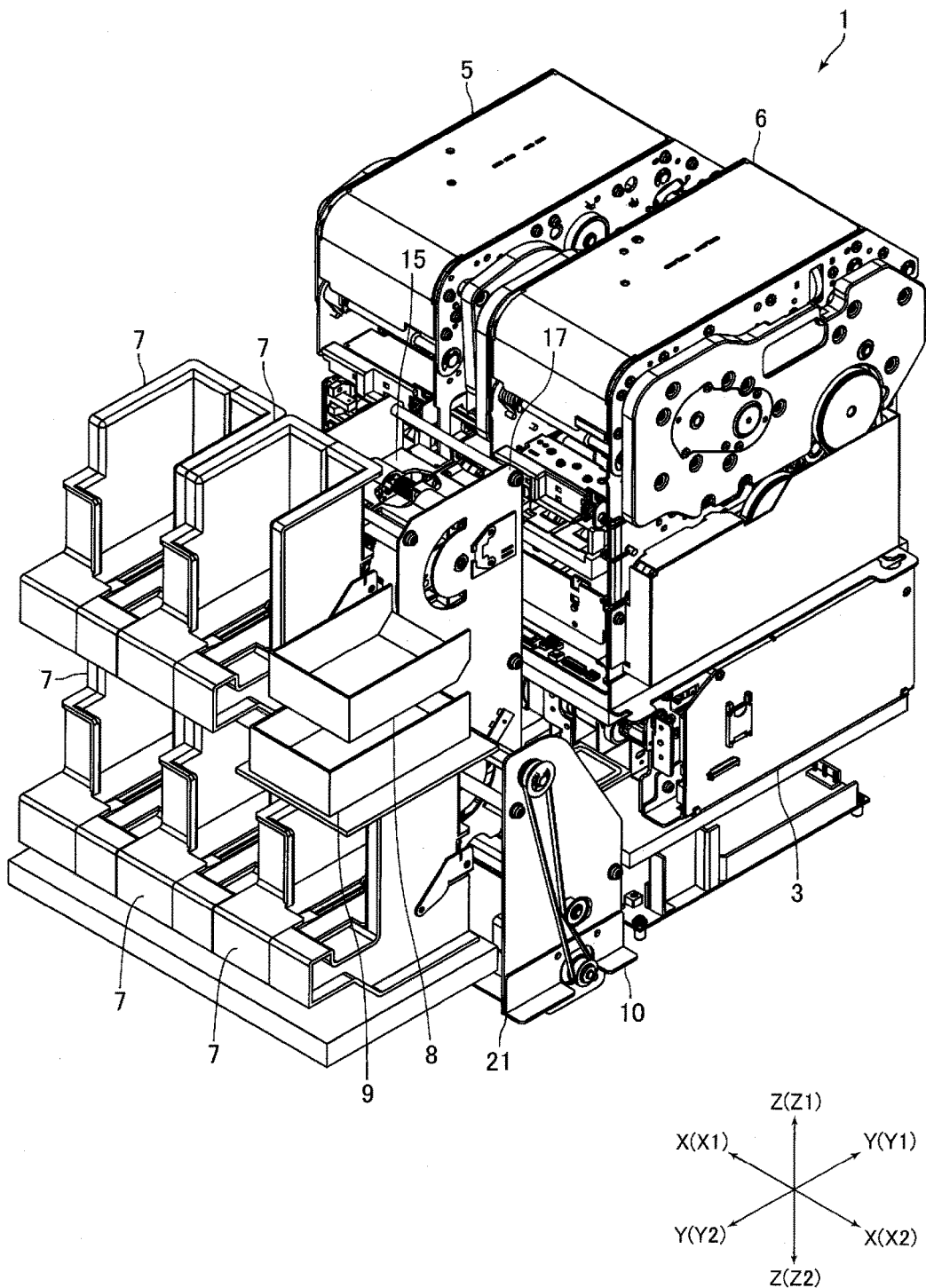
FIG. 2 is a perspective view showing the card issuing device shown in FIG. 1 which is viewed from another angle.
Figure 3A:
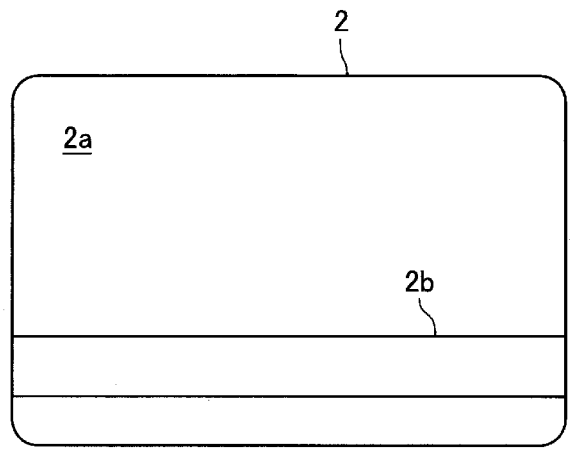
FIGS. 3(A) and 3(B) are explanatory views showing a card used in the card issuing device shown in FIG. 1.
Figure 3B:
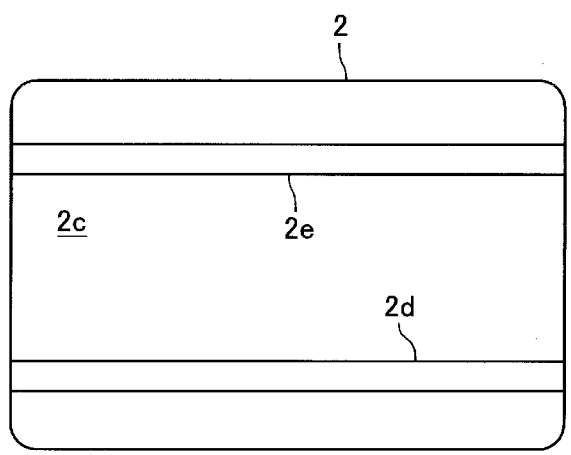

FIG. 1 is a perspective view showing a card issuing device 1 in accordance with an embodiment of the present invention. FIG. 2 is a perspective view showing the card issuing device 1 shown in FIG. 1 which is viewed from another angle. FIGS. 3(A) and 3(B) are explanatory views showing a card 2 which is used in the card issuing device 1 shown in FIG. 1.

A card issuing device 1 in this embodiment includes two card readers 3 and 4 structured to perform reproduction of data recorded in a card 2 (see FIGS. 3(A) and 3(B)) and recording of data to the card 2, a printer 5 structured to print on a card 2, a labeling machine (labeler) 6 structured to stick a label (seal) on a card 2, five card accommodation parts 7 in which cards 2 before issue are accommodated, a card taking-out part 8 for taking out a card 2 to be issued, a card collection part 9 to which a card 2 having become unnecessary is collected, and a card conveying mechanism 10 structured to convey a card 2 between these structures.

A card 2 is a substantially rectangular-shaped card made of vinyl chloride whose thickness is about 0.7-0.8 mm. A rear face 2a of the card 2 is formed with a magnetic stripe 2b in which magnetic data are recorded. A front face 2c of the card 2 is formed with a magnetic stripe 2d in which magnetic data are recorded. The magnetic stripes 2b and 2d are magnetic stripes specified by JIS standard "JISX6302-2". Further, the front face 2c of the card 2 is formed with a magnetic stripe 2e in which magnetic data are recorded. The magnetic stripe 2e is formed in a longitudinal direction of the card 2 and, in a short-side direction of the card 2, the magnetic stripe 2e is separately formed from the magnetic stripe 2d with a predetermined space therebetween. In other words, in this embodiment, the front face 2c of the card 2 is formed with two magnetic stripes 2d and 2e, and the card 2 in this embodiment is a so-called double stripe card.

The rear face 2a of the card 2 may be formed with two magnetic stripes. In other words, the card 2 may be a double stripe card whose rear face 2a is formed with two magnetic stripes. Alternatively, the card 2 may be formed so that one magnetic stripe is formed on each of the rear face 2a and the front face 2c. Further, an IC chip may be incorporated in the card 2. In this case, a terminal part with which the IC chip is electrically connected is formed on the front face 2c of the card 2, or an antenna is incorporated in the card 2. Further, the card 2 may be a PET (polyethylene terephthalate) card whose thickness is about 0.18-0.36 mm, or may be a paper card having a predetermined thickness.

In the following descriptions, three directions perpendicular to each other are referred to as an "X" direction, a "Y" direction and a "Z" direction. In this embodiment, the "Z" direction is coincided with the vertical direction and thus the "Z" direction is an upper and lower direction. Further, the "X" direction is referred to as a right and left direction, the "Y" direction is referred to as a front and rear direction, and the "X1" direction side is a "right" side, the "X2" direction side is a "left" side, the "Y1" direction side is a "front" side, the "Y2" direction side is a "rear" (back) side, the "Z1" direction side is an "upper" side, and the "Z2" direction side is a "lower" side.

Card readers 3 and 4 are disposed so as to be adjacent to each other in the right and left direction. In this embodiment, the card reader 3 is disposed on a left side and the card reader 4 is disposed on a right side. Further, the card readers 3 and 4 are disposed on a front end side of the card issuing device 1. The card reader 3 and the card reader 4 are similarly structured to each other. In other words, the card reader 3 and the card reader 4 are structured so that the same structural components are similarly disposed. The card reader 3 and the card reader 4 structured similarly are disposed so that their postures in the front and rear direction are reversed to each other. In other words, when viewed in the upper and lower direction, the card reader 3 and the card reader 4 are point-symmetrically disposed with respect to the midpoint of an imaginary line obtained by connecting the center of the card reader 3 and the center of the card reader 4. Further, a card conveying passage is formed in each of the insides of the card readers 3 and 4, the card readers 3 and 4 include conveying mechanisms for a card 2, and the card readers 3 and 4 are disposed so that a card 2 is conveyed in the front and rear direction. In the card readers 3 and 4, a card 2 is conveyed in a state that a longitudinal direction of the card 2 and the front and rear direction are coincided with each other.

The card readers 3 and 4 include magnetic heads (not shown) configured to perform reading of magnetic data recorded on a card 2 and/or recording of magnetic data to a card 2. In this embodiment, reading of magnetic data recorded in the magnetic stripes 2b and 2d and/or recording of magnetic data to the magnetic stripes 2b and 2d are performed by the magnetic heads of the card reader 3, and the reading of magnetic data recorded in the magnetic stripe 2e and/or recording of magnetic data to the magnetic stripe 2e are performed by the magnetic head of the card reader 4.

The card reader 3 includes two magnetic heads, i.e., a magnetic head configured to perform reading and/or recording of magnetic data to the magnetic stripe 2b formed on the rear face 2a of the card 2 and a magnetic head configured to perform reading and/or recording of magnetic data to the magnetic stripe 2d formed on the front face 2c of the card 2.

The card reader 3 and the card reader 4 are similarly structured to each other and thus the card reader 4 also includes two magnetic heads. However, it is sufficient that the card reader 4 includes a magnetic head configured to perform reading and/or recording of magnetic data to the magnetic stripe 2e formed on the front face 2c of the card 2 and thus the card reader 4 may include only one magnetic head. Further, in a case that an IC chip is incorporated in the card 2, it is sufficient that only one of the card reader 3 and the card reader 4 includes IC contact points and/or an antenna for performing data communication with the card 2. For example, it is sufficient that only the card reader 3 includes IC contact points and/or an antenna. As described above, the structure of the card reader 3 and the structure of the card reader 4 may be different from each other.

The printer 5 and the labeler 6 are disposed so as to be adjacent to each other in the right and left direction. In this embodiment, the printer 5 is disposed on the right side and the labeler 6 is disposed on the left side. Further, the card issuing device 1 in this embodiment is provided with a so-called two-story structure, and the printer 5 and the labeler 6 are disposed on the front end side of the card issuing device 1 and on the upper side of the card readers 3 and 4. In other words, the card readers 3 and 4 and the printer 5 and the labeler 6 are overlapped with each other in the upper and lower direction. Further, the labeler 6 is disposed on the upper side of the card reader 3 and the printer 5 is disposed on the upper side of the card reader 4.

An inside of the printer 5 is formed with a card conveying passage and the printer 5 includes a conveying mechanism for a card 2. The printer 5 is disposed so that a card 2 is conveyed in the front and rear direction. Further, an inside of the labeler 6 is formed with a card conveying passage and the labeler 6 includes a conveying mechanism for a card 2. The labeler 6 is disposed so that a card 2 is conveyed in the front and rear direction. In the printer 5 and the labeler 6, a card 2 is conveyed in a state that a longitudinal direction of the card 2 is coincided with the front and rear direction.

Three of five card accommodation parts 7 are disposed so as to be adjacent to each other in the right and left direction. Further, the three card accommodation parts 7 are disposed on the rear end side of the card issuing device 1. The card taking-out part 8 and the card collection part 9 are disposed so as to be overlapped with each other in the upper and lower direction. Two remaining card accommodation parts 7 and the card taking-out part 8 and the card collection part 9 are disposed so as to be adjacent to each other in the right and left direction. Further, the card issuing device 1 in this embodiment is, as described above, provided with a so-called two-story structure. Therefore, the two card accommodation parts 7, the card taking-out part 8 and the card collection part 9 are disposed on the rear end side of the card issuing device 1 and are disposed on the upper side of the three card accommodation parts 7 adjacently disposed to each other in the right and left direction. In this embodiment, the card taking-out part 8 is disposed on an upper side and the card collection part 9 is disposed on a lower side. Further, the card taking-out part 8 and the card collection part 9 are disposed on an upper side of the card accommodation part 7 disposed on the left end of the three card accommodation parts 7 adjacently disposed in the right and left direction.

The card accommodation part 7 includes an accommodation box in which a plurality of cards 2 before issue is stacked and accommodated, and a sending-out mechanism for a card 2 which is disposed on a lower side of the accommodation box. The accommodation box is formed in a box shape whose upper end side and rear end side are opened. Cards 2 are accommodated in the accommodation box so that a longitudinal direction of a card 2 and the front and rear direction are coincided with each other and, in addition, so that a short-side direction of the card 2 and the right and left direction are coincided with each other. The sending-out mechanism includes, for example, a feeding pawl configured to abut with a rear end of the undermost card 2 in the accommodation box and to send out the card 2, and a drive mechanism for the feeding pawl. The sending-out mechanism sends out cards 2 accommodated in the accommodation box toward a front side one by one. A lower end side of a front side face of the accommodation box is formed with a sending-out aperture through which a card 2 sent out by the sending-out mechanism is passed. The card taking-out part 8 and the card collection part 9 are formed in a box shape whose upper face is opened.

The card conveying mechanism 10 is disposed at a middle position in the front and rear direction of the card issuing device 1 and, in the front and rear direction, the card conveying mechanism 10 is disposed in the front and rear direction between the card readers 3 and 4, the printer 5 and the labeler 6, and the five card accommodation parts 7, the card taking-out part 8 and the card collection part 9 so as to be interposed between the card readers 3 and 4, the printer 5 and the labeler 6, and the five card accommodation parts 7, the card taking-out part 8 and the card collection part 9. Next, a specific structure of the card conveying mechanism 10 will be described below.

(Structure of Card Conveying Mechanism)

Figure 4:
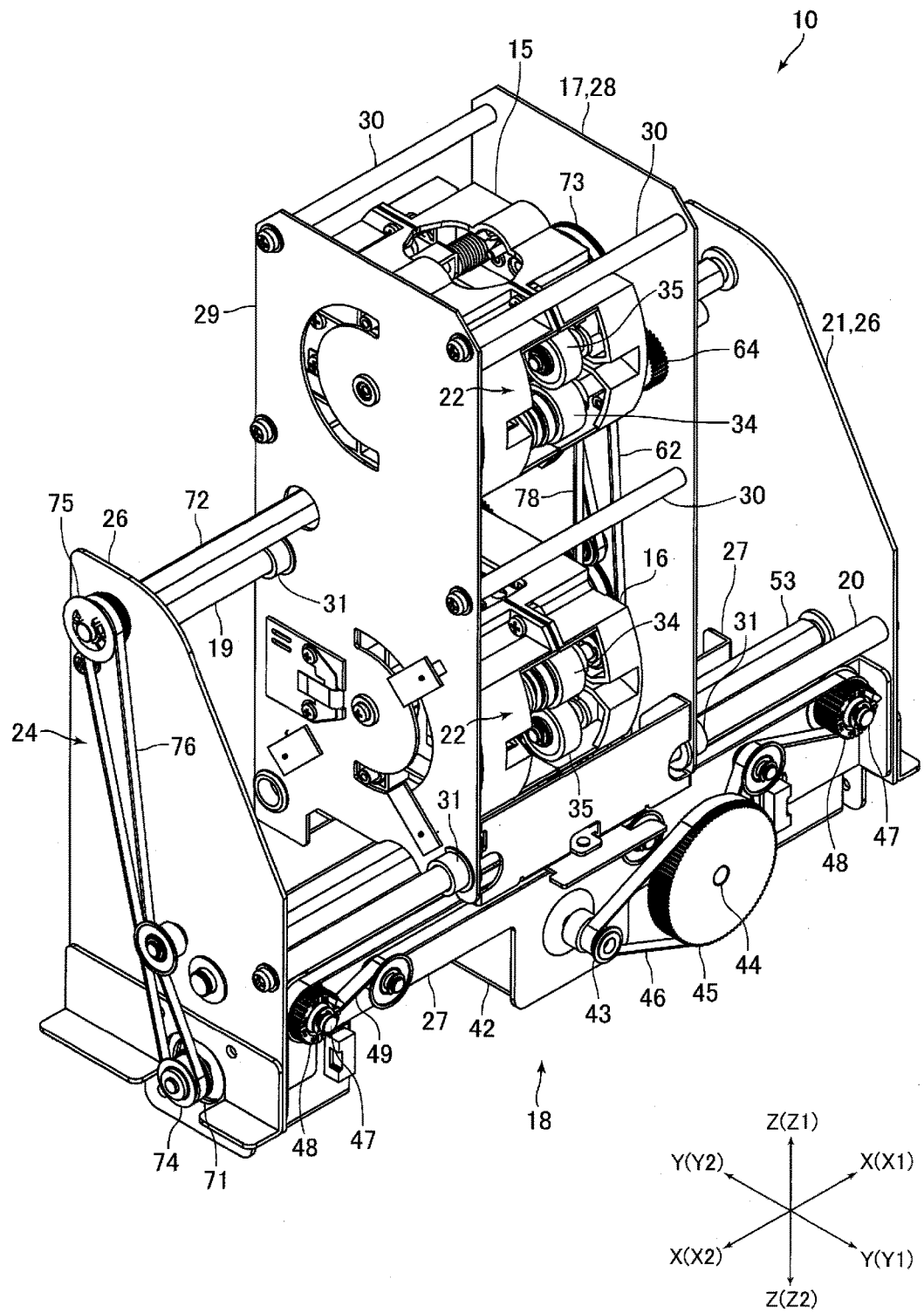
FIG. 4 is a perspective view showing a card conveying mechanism shown in FIG. 1.
Figure 5:
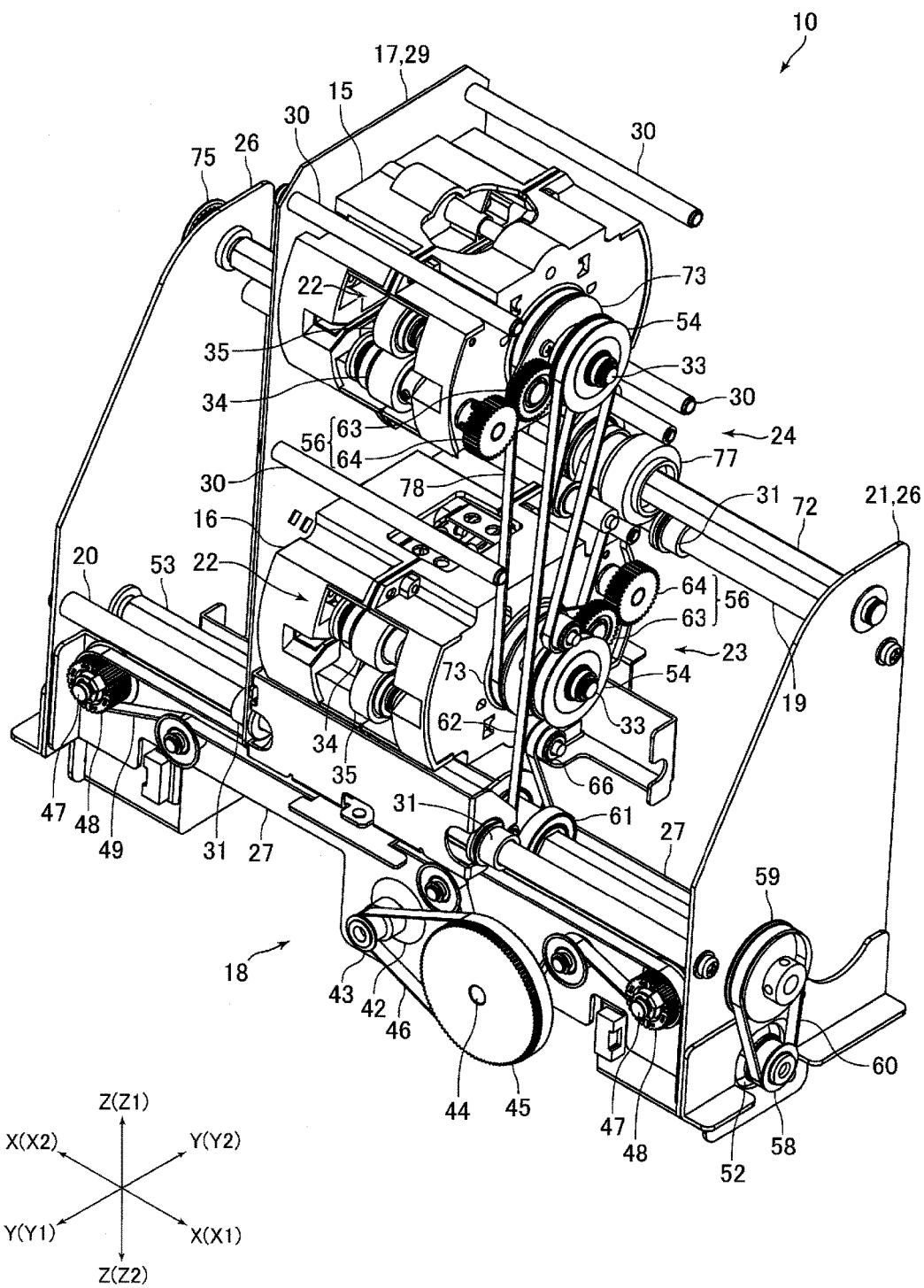
FIG. 5 is a perspective view showing a state in which a side plate is detached from the card conveying mechanism shown in FIG. 4 and which is viewed from an opposite side.
Figure 6:
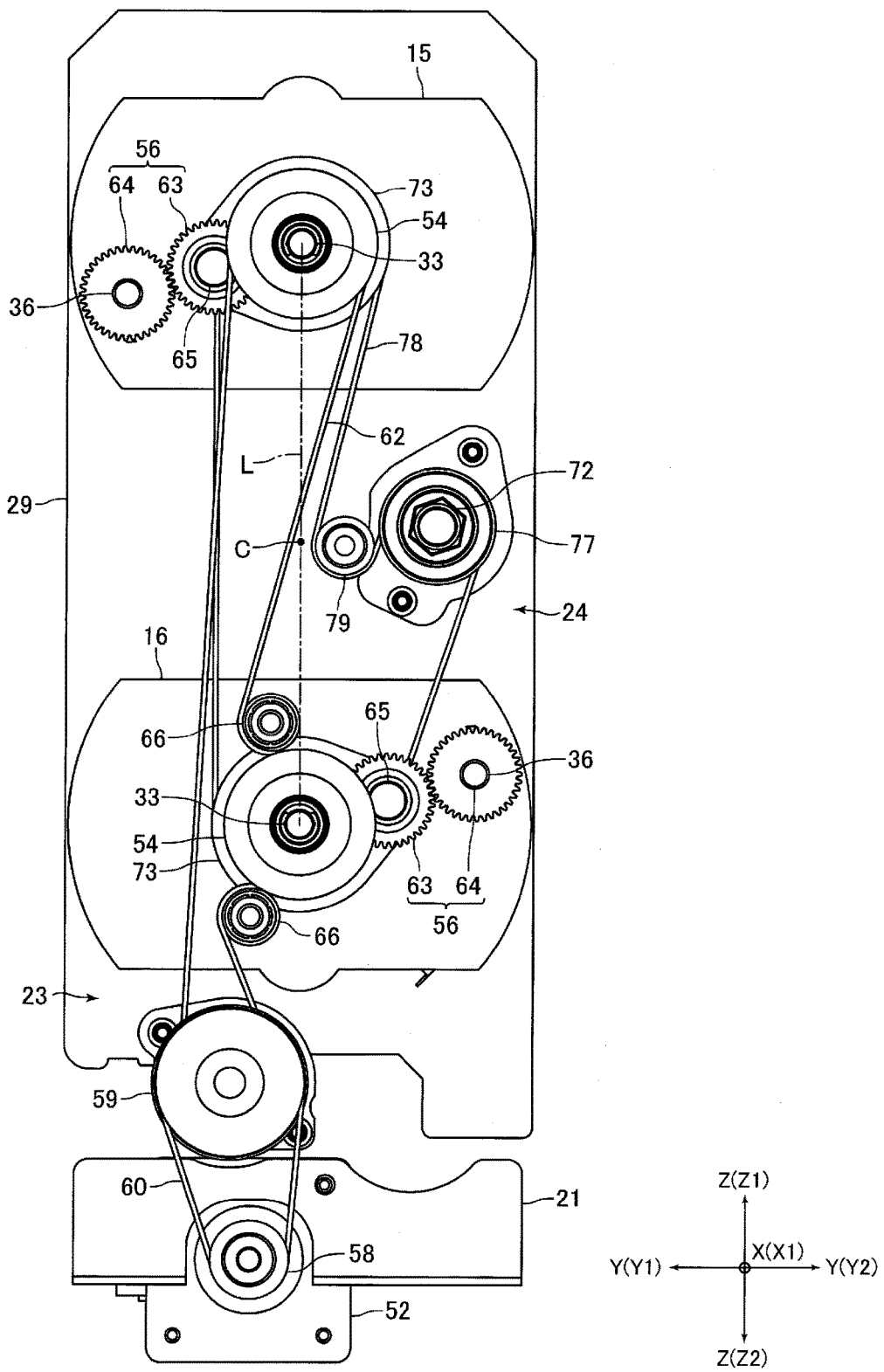
FIG. 6 is an explanatory side view showing a structure of a drawing and sending-out drive mechanism and a turning mechanism shown in FIG. 5.
Figure 7:
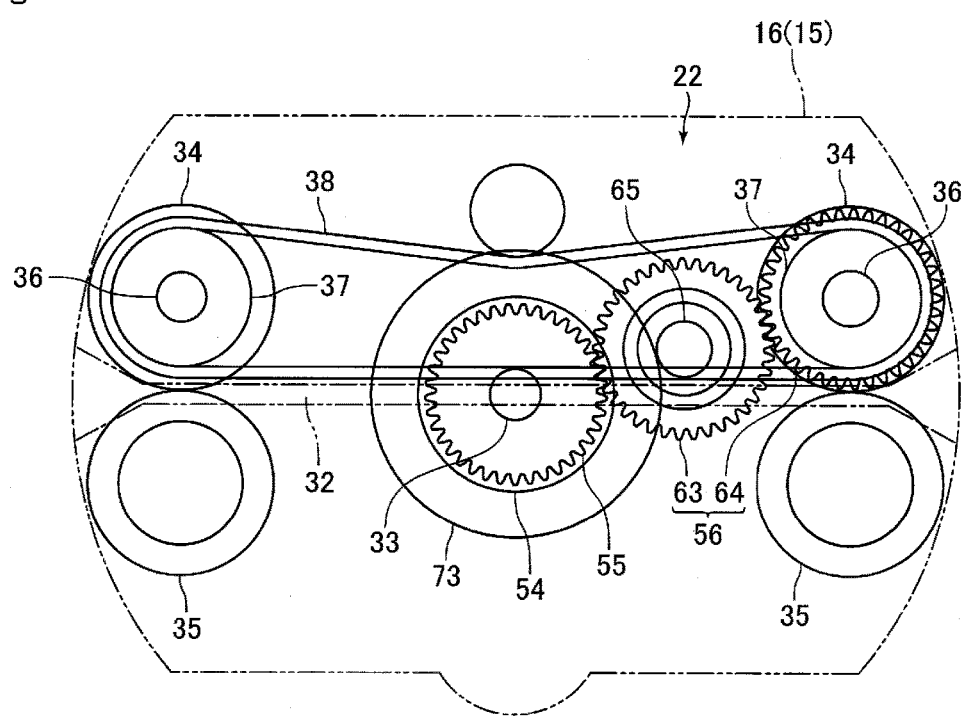
FIG. 7 is an explanatory view showing a drawing and sending-out mechanism and a part of the drawing and sending-out drive mechanism shown in FIG. 5.
Figure 8A:
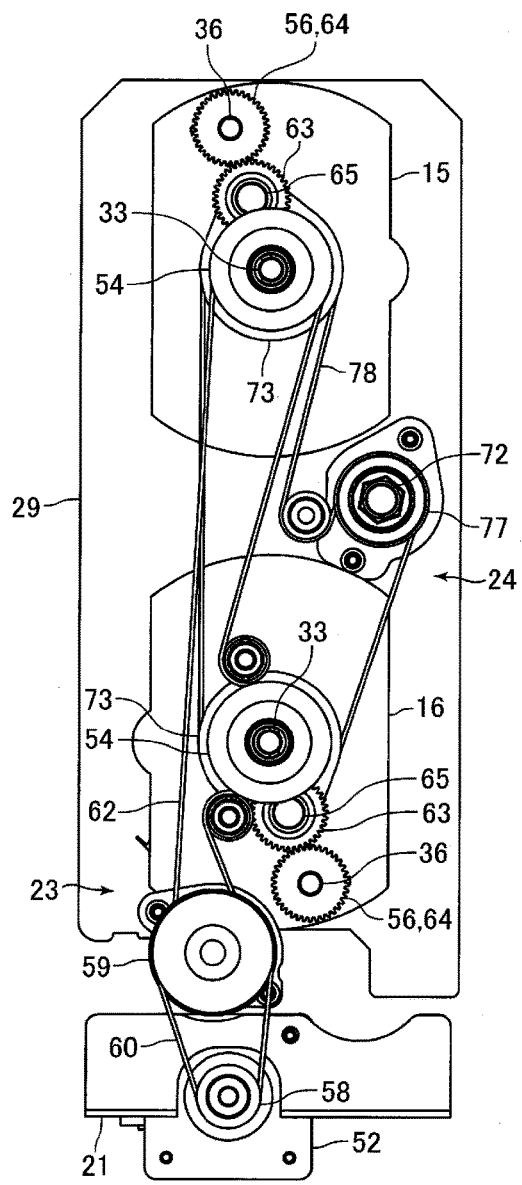
FIGS. 8(A) and 8(B) are explanatory views showing a turning operation of a first card holding part and a second card holding part shown in FIG. 5.
Figure 8B:
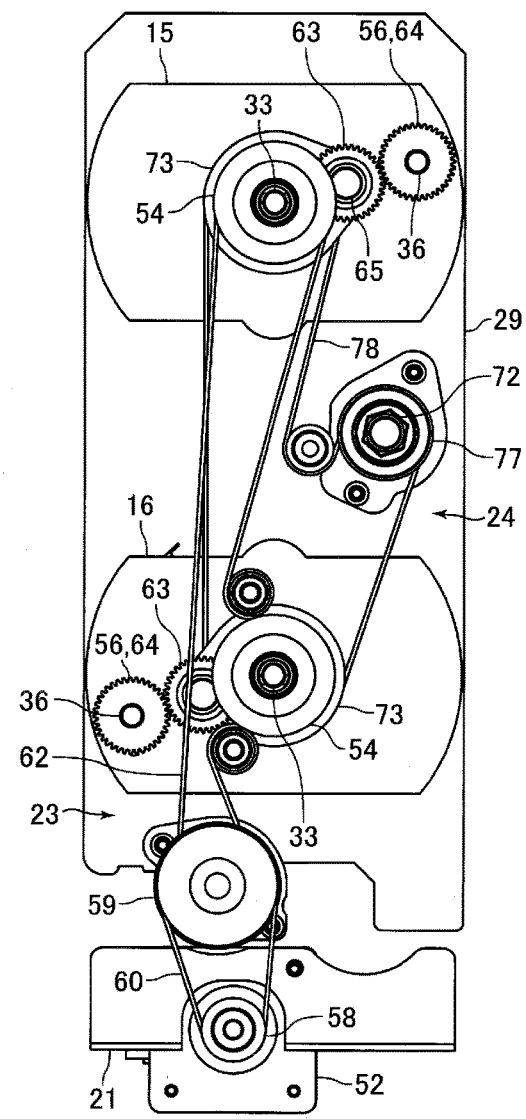
Figure 8B:
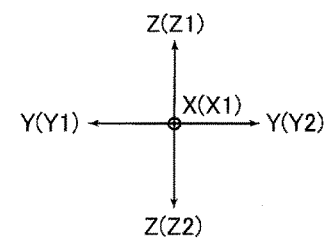

FIG. 4 is a perspective view showing the card conveying mechanism 10 shown in FIG. 1. FIG. 5 is a perspective view showing a state in which a side plate 28 is detached from the card conveying mechanism 10 shown in FIG. 4 and which is viewed from an opposite side. FIG. 6 is an explanatory side view showing a structure of a drawing and sending-out drive mechanism 23 and a turning mechanism 24 shown in FIG. 5. FIG. 7 is an explanatory view showing a drawing and sending-out mechanism 22 and a part of the drawing and sending-out drive mechanism 23 shown in FIG. 5. FIGS. 8(A) and 8(B) are explanatory views showing a turning operation of card holding parts 15 and 16 shown in FIG. 5.

The card conveying mechanism 10 includes two card holding parts 15 and 16 where a card 2 is temporarily held in their insides, a carriage 17 on which the card holding parts 15 and 16 are mounted, a carriage moving mechanism 18 structured to linearly move the carriage 17 in a horizontal direction, two guide shafts 19 and 20 for guiding the carriage 17 in a moving direction of the carriage 17, and support frames 21 which support both end sides of the guide shafts 19 and 20. In this embodiment, the carriage 17 is moved in the right and left direction. In other words, the right and left direction ("X" direction) in this embodiment is a moving direction of the carriage 17.

The card holding parts 15 and 16 include a drawing and sending-out mechanism 22 structured to draw in and send out a card 2. In other words, the card holding parts 15 and 16 include the drawing and sending-out mechanism 22 for drawing a card 2 into insides of the card holding parts 15 and 16 and for sending out the card 2 from the insides of the card holding parts 15 and 16. Further, the card conveying mechanism 10 includes a drawing and sending-out drive mechanism 23 structured to drive the drawing and sending-out mechanism 22 and a turning mechanism 24 structured to turn the card holding parts 15 and 16 with respect to the carriage 17.

The support frame 21 includes two side plates 26 which are formed in a flat plate shape parallel to the "Y-Z" plane structured of the front and rear direction ("Y" direction) and the upper and lower direction ("Z" direction) and are separately disposed from each other with a predetermined space therebetween in the right and left direction, and two connecting plates 27 which connect lower end sides of the two side plates 26 with each other. The side plate 26 is formed in substantially a pentagonal shape. An upper end face and a lower end face of the side plate 26 are parallel to the "X-Y" plane structured of the right and left direction ("X" direction) and the front and rear direction ("Y" direction), and a rear end face of the side plate 26 is parallel to the "Z-X" plane structured of the upper and lower direction ("Z" direction) and the right and left direction ("X" direction). A lower end side portion of a front end face of the side plate 26 is parallel to the "Z-X" plane. An upper end side portion of the front end face of the side plate 26 is inclined toward a rear side as going to an upper side.

The guide shafts 19 and 20 are formed in a long and thin circular columnar shape. The guide shafts 19 and 20 are fixed and supported by two side plates 26 so that their axial directions and the right and left direction are coincided with each other. The guide shaft 19 is supported in portions of two side plates 26 on the upper end side and the rear end side. The guide shaft 20 is supported in portions of two side plates 26 on the lower end side and the front end side. The guide shaft 19 in this embodiment is a first guide shaft and the guide shaft 20 is a second guide shaft. Further, in this embodiment, the front and rear direction is a second direction perpendicular to the right and left direction which is a moving direction of the carriage 17 and the upper and lower direction. The guide shaft 19 is supported in a portion on one side in the second direction (specifically, a rear end portion of the support frame 21).

The carriage 17 includes two side plates 28 and 29, which are formed in a flat plate shape parallel to the "Y-Z" plane and are separately disposed from each other with a predetermined space therebetween in the right and left direction, and four connecting shafts 30 connecting two side plates 28 and 29 with each other. The side plate 28 structures a right side face of the carriage 17 and the side plate 29 structures a left side face of the carriage 17. The connecting shaft 30 is disposed so that its axial direction and the right and left direction are coincided with each other and both end sides of the connecting shaft 30 are fixed to the side plates 28 and 29. The side plates 28 and 29 are formed with two through-holes penetrating in the right and left direction, and a guide bush 31 formed in a substantially cylindrical tube shape is attached to the through-hole. The guide shafts 19 and 20 are inserted on an inner peripheral side of the guide bush 31.

The card holding part 15 and the card holding part 16 are disposed so as to be overlapped with each other in the upper and lower direction. In other words, the card holding part 15 and the card holding part 16 are mounted on a common carriage 17 so as to be overlapped with each other in the upper and lower direction. In this embodiment, the card holding part 15 is disposed on an upper side and the card holding part 16 is disposed on a lower side. The card holding parts 15 and 16 are similarly structured to each other. In other words, the card holding part 15 and the card holding part 16 are structured of the same structural components which are disposed similarly and are formed in the same shape. Further, the card holding part 15 and the card holding part 16 are disposed at the same position in the front and rear direction and the right and left direction.

Outward shapes of the card holding parts 15 and 16 are formed in a substantially rectangular block shape as a whole. The card holding parts 15 and 16 include the drawing and sending-out mechanism 22 as described above. A card conveying passage 32 where a card 2 drawn in or sent out by the drawing and sending-out mechanism 22 is conveyed is formed in insides of the card holding parts 15 and 16 in a straight shape (see FIG. 7). A turnable shaft 33 protruded toward outer sides in the right and left direction is fixed to both right and left side faces of the card holding parts 15 and 16.

The turnable shaft 33 is disposed so that its axial direction and the right and left direction are coincided with each other. Further, the turnable shaft 33 is formed so as to protrude toward outer sides in the right and left direction from the center positions of the card holding parts 15 and 16. The turnable shaft 33 is turnably supported by the side plates 28 and 29 of the carriage 17, and the card holding parts 15 and 16 are turnable with respect to the carriage 17 around the turnable shaft 33. Further, the turnable shaft 33 fixed to the card holding part 15 and the turnable shaft 33 fixed to the card holding part 16 are disposed at the same positions in the front and rear direction and the right and left direction.

The drawing and sending-out mechanism 22 includes two drive rollers 34 and two pad rollers 35 oppositely disposed to the drive rollers 34. The pad roller 35 is urged toward the drive roller 34. The drive roller 34 is disposed so as to face the card conveying passage 32 from one side with respect to the card conveying passage 32 in a thickness direction of a card 2, and the pad roller 35 is disposed so as to face the card conveying passage 32 from the other side with respect to the card conveying passage 32 in the thickness direction of the card 2.

The drive roller 34 and the pad roller 35 are respectively disposed on both end sides of the card conveying passage 32 in a conveying direction of a card 2. A distance between the two drive rollers 34 (in other words, a distance between two pad rollers 35) is set to be shorter than a length in a longitudinal direction of a card 2, and both end sides of a card 2 can be held by two drive rollers 34 and two pad rollers 35 in a state that the card is taken into the insides of the card holding parts 15 and 16. A card 2 is drawn into the insides of the card holding parts 15 and 16 and is sent out from the insides of the card holding parts 15 and 16 in a state that the card 2 is sandwiched between the drive roller 34 and the pad roller 35.

The drive roller 34 is fixed to the rotation shaft 36. The rotation shaft 36 is turnably held by main body parts of the card holding parts 15 and 16 so that its axial direction and the right and left direction are coincided with each other. As shown in FIG. 7, a pulley 37 is fixed to the rotation shaft 36. A belt 38 is stretched over two pulleys 37 respectively disposed on both end sides of the card conveying passage 32 in a conveying direction of a card 2. The card holding part 15 in this embodiment is a first card holding part and the card holding part 16 is a second card holding part. Further, in this embodiment, the drawing and sending-out mechanism 22 provided in the card holding part 15 is a first drawing and sending-out mechanism, and the drawing and sending-out mechanism 22 provided in the card holding part 16 is a second drawing and sending-out mechanism.

The carriage moving mechanism 18 includes one motor 42 as a drive source, a pulley 43 fixed to an output shaft of the motor 42, a rotation shaft 44 rotatably supported by the connecting plate 27, a pulley 45 fixed to the rotation shaft 44, and a belt 46 stretched over the pulleys 43 and 45. The motor 42 is fixed to the connecting plate 27 so that its output shaft is protruded to a front side. The rotation shaft 44 is rotatably supported in a middle portion of the connecting plate 27 in the right and left direction so that its axial direction and the front and rear direction are coincided with each other.

A fixed shaft 47 is fixed to each of both end sides of the connecting plate 27 in the right and left direction. The fixed shaft 47 is fixed to the connecting plate 27 so that its axial direction and the front and rear direction are coincided with each other. A pulley 48 is rotatably held by the fixed shaft 47. Further, a pulley not shown is fixed to the rotation shaft 44. A belt 49 is stretched over the pulley and two pulleys 48. A part of the belt 49 is fixed to a lower end side of the carriage 17. In the card conveying mechanism 10, when the motor 42 is rotated and the belt 49 is moved, the carriage 17 is guided by the guide shafts 19 and 20 and is moved between two side plates 26 in the right and left direction.

The drawing and sending-out drive mechanism 23 includes one motor 52 which is a drive source, one power transmission shaft 53 which is formed in a long and thin polygonal columnar shape, pulleys 54 which are rotatably held by the turnable shafts 33 protruded to the right side from right side faces of the card holding parts 15 and 16, gears 55 (see FIG. 7) which are rotatably held by the turnable shafts 33 and rotated together with the pulleys 54, and gear trains 56 which are disposed between the gears 55 and the drawing and sending-out mechanism 22 and are engaged with the gears 55 in a power transmission path from the motor 52 to the drawing and sending-out mechanism 22.

The motor 52 in this embodiment is a drawing and sending-out motor, and the power transmission shaft 53 is a drawing and sending-out power transmission shaft. Further, the pulley 54 which is rotatably held by the turnable shaft 33 protruded to the right side from the right side face of the card holding part 15 is a first drawing and sending-out pulley which is connected with the drawing and sending-out mechanism 22 of the card holding part 15, the gear 55 rotated together with the pulley 54 is a first gear, and the gear train 56 disposed between the gear 55 and the drawing and sending-out mechanism 22 in the power transmission path from the motor 52 to the drawing and sending-out mechanism 22 of the card holding part 15 is a first gear train. Further, the pulley 54 which is rotatably held by the turnable shaft 33 protruded to the right side from the right side face of the card holding part 16 is a second drawing and sending-out pulley which is connected with the drawing and sending-out mechanism 22 of the card holding part 16, the gear 55 rotated together with the pulley 54 is a second gear, and the gear train 56 disposed between the gear 55 and the drawing and sending-out mechanism 22 in the power transmission path from the motor 52 to the drawing and sending-out mechanism 22 of the card holding part 16 is a second gear train.

The motor 52 is fixed to a lower end side portion of the support frame 21. Further, the motor 52 is fixed to a right end side portion of the support frame 21 so that its output shaft is protruded from the support frame 21 to the right side. The power transmission shaft 53 is formed in a long and thin hexagonal columnar shape and is disposed so that its axial direction and the right and left direction are coincided with each other. Both end sides in the right and left direction of the power transmission shaft 53 is rotatably supported by the support frame 21. In other words, both end sides in the right and left direction of the power transmission shaft 53 is rotatably supported by the side plates 26. Further, the power transmission shaft 53 is adjacently disposed to the guide shaft 20 on an obliquely rear and lower side and is turnably supported by portions of two side plates 26 on the lower end side and the front end side.

A pulley 58 is fixed to an output shaft of the motor 52. A pulley 59 is fixed to a right end side of the power transmission shaft 53. A belt 60 is stretched over the pulley 58 and the pulley 59. In this embodiment, a first drawing and sending-out power transmission mechanism structured to transmit power of the motor 52 that is a drawing and sending-out motor to the power transmission shaft 53 that is a drawing and sending-out power transmission shaft and rotate the power transmission shaft 53 is structured by the pulleys 58 and 59 and the belt 60.

A pulley 61 structuring a part of the drawing and sending-out drive mechanism 23 is rotatably held in the side plate 28 of the carriage 17 (see FIG. 5). The power transmission shaft 53 is inserted into an inner peripheral side of the pulley 61. A sectional shape of an inner peripheral face of the pulley 61 perpendicular to the right and left direction is formed in a hexagonal shape corresponding to the shape of the power transmission shaft 53 and, when the power transmission shaft 53 is rotated, power of the power transmission shaft 53 is transmitted to the pulley 61 and the pulley 61 is rotated. A belt 62 is stretched over the pulley 54 rotatably held by the turnable shaft 33 fixed to the card holding part 15, the pulley 54 rotatably held by the turnable shaft 33 fixed to the card holding part 16, and the pulley 61. The belt 62 in this embodiment is a drawing and sending-out belt.

The gear 55 is integrally formed with the pulley 54 and is coaxially disposed with the gear 55. Further, the gear 55 is formed so as to be adjacent to the pulley 54 on a left side. The gear train 56 is structured of a gear 63 engaged with the gear 55 and a gear 64 engaged with the gear 63. The gears 63 are rotatably held by fixed shafts 65 which are protruded from right side faces of the card holding parts 15 and 16 to the right side. The fixed shafts 65 are fixed to the right side faces of the card holding parts 15 and 16 so that its axial direction and the right and left direction are coincided with each other. The gear 64 is fixed to the rotation shaft 36. Specifically, the right end side of the rotation shaft 36 is protruded to the right side from the right side faces of the card holding parts 15 and 16, and the gear 64 is fixed to the portion of the rotation shaft 36 which is protruded to the right side from the right side faces of the card holding parts 15 and 16.

As described above, the pulley 54 and the gear 55 are rotatably held by the turnable shaft 33 which is protruded from the right side faces of the card holding parts 15 and 16 to the right side. Further, the gear 63 is rotatably held by the fixed shaft 65 which is protruded from the right side faces of the card holding parts 15 and 16 to the right side. In addition, the gear 64 is fixed to a portion of the rotation shaft 36 which is protruded to the right side with respect to the right side faces of the card holding parts 15 and 16. In other words, the pulley 54, the belt 62 and the gears 55, 63 and 64 are disposed on the right side with respect to the card holding parts 15 and 16. Further, the gear 63 is rotatably held by the card holding parts 15 and 16 through the fixed shaft 65, and the gear 64 is rotatably held by the card holding parts 15 and 16 through the rotation shaft 36. In other words, the gears 63 and 64 structuring the gear train 56 are rotatably held by the card holding parts 15 and 16.

In this embodiment, a second drawing and sending-out power transmission mechanism which transmits power transmitted to the power transmission shaft 53, which is the drawing and sending-out power transmission shaft, to the drawing and sending-out mechanism 22 is structured of two pulleys 54, the pulley 61, the belt 62, the gear 55 and the gear train 56. Further, the right direction ("X1" direction) in this embodiment is one side in the moving direction of the carriage 17, i.e. a first direction. The drawing and sending-out drive mechanism 23 includes two tension pulleys 66 for applying tension to the belt 62. Two tension pulleys 66 are disposed so as to be adjacent to both upper and lower sides of the pulley 54 held by the turnable shaft 33 which is fixed to the card holding part 16. Further, the tension pulley 66 is rotatably held by a fixed shaft which is fixed to the side plate 28 of the carriage 17.

In the card conveying mechanism 10, when the motor 52 is rotated, the power transmission shaft 53, the pulleys 54 and 61, the belt 62, the gears 55, 63 and 64 and the like are rotated, and the drive rollers 34 of the card holding part 15 and the drive rollers 34 of the card holding part 16 are rotated in the same direction. When the drive rollers 34 are rotated, the drawing and sending-out mechanism 22 of the card holding part 15 and the drawing and sending-out mechanism 22 of the card holding part 16 draw a card 2 into insides of the card holding parts 15 and 16 and send out a card 2 held in the insides of the card holding parts 15 and 16. In other words, when the motor 52 is rotated, the drawing and sending-out mechanisms 22 of the card holding parts 15 and 16 perform a drawing-in operation of a card 2 or a sending-out operation of a card 2.

The turning mechanism 24 includes one motor 71 (see FIG. 4) which is a drive source, one power transmission shaft 72 which is formed in a long and thin polygonal columnar shape, and pulleys 73 fixed to the turnable shafts 33 which are protruded from the right side faces of the card holding parts 15 and 16 to the right side. The motor 71 in this embodiment is a turning motor, and the power transmission shaft 72 is a turning power transmission shaft. Further, the pulley 54 fixed to the turnable shaft 33 which is protruded from the right side face of the card holding part 15 to the right side is a first turning pulley, and the pulley 54 fixed to the turnable shaft 33 which is protruded from the right side face of the card holding part 16 to the right side is a second turning pulley.

The motor 71 is fixed to a lower end side portion of the support frame 21. Further, the motor 71 is fixed to a left end side portion of the support frame 21 so that its output shaft is protruded from the support frame 21 to a left side. The power transmission shaft 72 is formed in a long and thin hexagonal columnar shape and is disposed so that its axial direction and the right and left direction are coincided with each other. Both end sides in the right and left direction of the power transmission shaft 72 are rotatably supported by the support frame 21. In other words, both end sides in the right and left direction of the power transmission shaft 72 are rotatably supported by the side plates 26. Further, the power transmission shaft 72 is adjacently disposed to the guide shaft 19 on an obliquely front upper side and is turnably supported by portions of two side plates 26 on an upper end side and on a rear end side. As described above, in this embodiment, the front and rear direction is a second direction, and the power transmission shaft 72 is supported by a portion on one side in the second direction (specifically, in a rear end portion of the frame 21).

A pulley 74 is fixed to an output shaft of the motor 71. A pulley 75 is fixed to a left end side of the power transmission shaft 72. A belt 76 is stretched over the pulley 74 and the pulley 75. In this embodiment, a first turning power transmission mechanism is structured of the pulleys 74 and 75 and the belt 76 for transmitting power of the motor 71 which is a turning motor to the power transmission shaft 72 which is a turning power transmission shaft to rotate the power transmission shaft 72.

The side plate 28 of the carriage 17 rotatably holds a pulley 77 structuring a part of the turning mechanism 24. The power transmission shaft 72 is inserted on an inner peripheral side of the pulley 77. A sectional shape of an inner peripheral face of the pulley 77 perpendicular to the right and left direction is formed in a hexagonal shape corresponding to the shape of the power transmission shaft 72 and, when the power transmission shaft 72 is rotated, power of the power transmission shaft 72 is transmitted to the pulley 77 and the pulley 77 is rotated. A belt 78 is stretched over the pulley 73 fixed to the turnable shaft 33 which is fixed to the card holding part 15, the pulley 73 which is rotatably held by the turnable shaft 33 fixed to the card holding part 16, and the pulley 77. The belt 78 in this embodiment is a turning belt.

As described above, the pulley 54 is rotatably held by the turnable shaft 33 and the pulley 73 and the pulley 54 are coaxially disposed with each other. Further, the pulleys 73 and the belt 78 are disposed on the right side with respect to the card holding parts 15 and 16. Further, the pulleys 73 and the belt 78 are disposed on the left side with respect to the pulleys 54, the gears 55 and the gear trains 56. In this embodiment, a second turning power transmission mechanism is structured by two pulleys 73 and the pulley 77 and the belt 78 for transmitting power transmitted to the power transmission shaft 72 which is a turning power transmission shaft to the card holding parts 15 and 16. The turning mechanism 24 includes a tension pulley 79 for applying tension to the belt 78 (see FIG. 6). The tension pulley 79 is adjacently disposed to the pulley 77 on the front side. Further, the tension pulley 79 is rotatably held by a fixed shaft which is fixed to the side plate 28 of the carriage 17.

In the card conveying mechanism 10, when the motor 71 is rotated, the power transmission shaft 72, the pulleys 73 and 77, the belt 78 and the like are turned and the turnable shaft 33 is turned and thus, the card holding part 15 and the card holding part 16 are turned together in the same direction around the turnable shafts 33. In other words, the card holding parts 15 and 16 are turned with the right and left direction as an axial direction of turning. Each of the card holding parts 15 and 16 in this embodiment is turnable by 180° with the turnable shaft 33 as a center from a state that the card conveying passage 32 is parallel to the horizontal direction (state shown in FIG. 6 or state shown in FIG. 8(B)) to a vertically reversed state of the card conveying passage 32 (state shown in FIG. 8(B) or state in FIG. 6). Further, in this embodiment, when the card holding parts 15 and 16 are turned to middle positions of turning ranges of the card holding parts 15 and 16 (in other words, when the card holding parts 15 and 16 are turned by 90° from the state shown in FIG. 6 or the state shown in FIG. 8(B)), an axial distance between the turnable shaft 33 fixed to the card holding part 15 and the turnable shaft 33 fixed to the card holding part 16 is set so that a card 2 is capable of being directly transferred between the card holding part 15 and the card holding part 16 in the upper and lower direction.

In this embodiment, in a state that the turnable shaft 33, the pulleys 54 and 73, the gear 55 and the gear train 56 are attached, the card holding part 15 and the card holding part 16 are formed in the same shape as each other. Further, when viewed in the right and left direction, the card holding part 15 and the second card holding part 16 are point-symmetrically disposed and the gear train 56 rotatably held by the card holding part 15 and the gear train 56 rotatably held by the card holding part 16 are point-symmetrically disposed with respect to the midpoint "C" of an imaginary line "L" (see FIG. 6) obtained by connecting the turning center of the card holding part 15 (in other words, an axial center of the turnable shaft 33 fixed to the card holding part 15) with the turning center of the card holding part 16 (in other words, an axial center of the turnable shaft 33 fixed to the card holding part 16).

In this embodiment, in a state that the card conveying passage 32 is set to be parallel to the horizontal direction, in the upper and lower direction, the heights of the card conveying passages of the card readers 3 and 4 and the height of the card conveying passage 32 of the card holding part 16 are coincided with each other, and the height of the card conveying passage of the printer 5 and the height of the card conveying passage of the labeler 6 and the height of the card conveying passage 32 of the card holding part 15 are coincided with each other. Further, in a state that the card conveying passage 32 is set to be parallel to the horizontal direction, in the upper and lower direction, the height of the card conveying passage 32 of the card holding part 15 and the heights of the sending-out apertures for a card 2 of two card accommodation parts 7 disposed on an upper side are coincided with each other. Further, the height of the card conveying passage 32 of the card holding part 16 and the heights of the sending-out apertures for a card 2 of three card accommodation parts 7 disposed on a lower side are coincided with each other. In addition, in a state that the card conveying passage 32 is set to be parallel to the horizontal direction, the card conveying passage 32 of the card holding part 15 is disposed on a slightly upper side with respect to a bottom face of the card taking-out part 8.

(Card Issuing Operation of Card Issuing Device)

A card issuing device 1 structured as described above issues a card 2, for example, by being operated as described below. An issuing operation of a card 2 as described below is an example of a card issuing operation by the card issuing device 1 and a card issuing operation by the card issuing device 1 is not limited to the operation described below.

In order to issue a card 2, first, either of five card accommodation parts 7 sends out a card 2 toward a front side. In this case, the card conveying passages 32 of the card holding parts 15 and 16 are set to be parallel to the horizontal direction, and the drawing and sending-out mechanism 22 of the card holding part 15 or the drawing and sending-out mechanism 22 of the card holding part 16 draws a card 2 sent out from the card accommodation part 7 into the inside of the card holding part 15 or the inside of the card holding part 16 and holds it. Further, in a case that a card 2 has been drawn into the inside of the card holding part 15, the card holding parts 15 and 16 are turned by 90° and the drawing and sending-out mechanisms 22 transfers the card 2 from the card holding part 15 to the card holding part 16. When transfer of the card 2 from the card holding part 15 to the card holding part 16 is finished, the card holding parts 15 and 16 are turned so that the card conveying passages 32 are parallel to the horizontal direction.

After that, the drawing and sending-out mechanism 22 of the card holding part 16 sends out the card 2 to a front side toward the card reader 3 and the card reader 3 draws the card 2. When the card 2 has been drawn into the inside of the card holding part 15 or the inside of the card holding part 16, in a case that the position in the right and left direction of the card holding part 16 and the position in the right and left direction of the card reader 3 are different from each other, the carriage 17 is moved in the right and left direction so that the position in the right and left direction of the card holding part 16 and the position in the right and left direction of the card reader 3 are coincided with each other before the drawing and sending-out mechanism 22 of the card holding part 16 sends out the card 2 toward the card reader 3. In this case, in a case that the card 2 is transferred from the card holding part 15 to the card holding part 16, the carriage 17 may be moved in the right and left direction while performing the transfer operation.

After that, the card reader 3 reads magnetic data recorded in a magnetic stripe 2b and a magnetic stripe 2d of the card 2 and records magnetic data in the magnetic stripes 2b and 2d. Further, in a case that an IC chip is incorporated in the card 2, the card reader 3 records data in the IC chip of the card 2. When recording of magnetic data to the magnetic stripes 2b and 2d and recording of data to the IC chip are finished, the card reader 3 sends out the card 2 to a rear side. The drawing and sending-out mechanism 22 of the card holding part 16 draws the card 2 sent out from the card reader 3 into the inside of the card holding part 16 and holds it. After that, the carriage 17 is moved to the right direction so that the position of the card holding part 16 and the position of the card reader 4 are coincided with each other in the right and left direction.

After that, the drawing and sending-out mechanism 22 of the card holding part 16 sends out the card 2 to a front side toward the card reader 4, and the card reader 4 draws the card 2. The card reader 4 records magnetic data in a magnetic stripe 2e of the card 2 and, after that, the card 2 is sent out to a rear side. Further, the drawing and sending-out mechanism 22 of the card holding part 16 draws the card 2 sent out from the card reader 4 into the inside of the card holding part 16 and holds it.

After that, the card holding parts 15 and 16 are turned by 90° and the drawing and sending-out mechanisms 22 transfers the card 2 from the card holding part 16 to the card holding part 15. When transfer of the card 2 from the card holding part 16 to the card holding part 15 is finished, the card holding parts 15 and 16 are turned so that the card conveying passages 32 are parallel to the horizontal direction. In this case, the position of the card holding part 15 and the position of the printer 5 are coincided with each other in the right and left direction.

After that, the drawing and sending-out mechanism 22 of the card holding part 15 sends out the card 2 to a front side toward the printer 5, and the printer 5 draws the card 2. After the printer 5 prints on the card 2, the card 2 is sent out to a rear side. Further, the drawing and sending-out mechanism 22 of the card holding part 15 draws the card 2 sent out from the printer 5 into the inside of the card holding part 15 and holds it. After that, the carriage 17 is moved to the left direction so that the position of the card holding part 15 and the position of the labeler 6 are coincided with each other in the right and left direction.

In a case that printing is performed on both faces of the card 2, the card holding parts 15 and 16 are turned by 180° in a state that the card 2 sent out from the printer 5 is held in the inside of the card holding part 15, and front and back faces of the card 2 are reversed. After that, the drawing and sending-out mechanism 22 of the card holding part 15 sends out the card 2 toward the printer 5 and the printer 5 draws the card 2 and printing is performed on the card 2 and the card 2 is sent out to a rear side.

When the carriage 17 is moved so that the position of the card holding part 15 and the position of the labeler 6 are coincided with each other in the right and left direction, the drawing and sending-out mechanism 22 of the card holding part 15 sends out the card 2 to a front side toward the labeler 6, and the labeler 6 draws the card 2. After the labeler 6 has stuck a label on the card 2, the labeler 6 sends out the card 2 to a rear side. The drawing and sending-out mechanism 22 of the card holding part 15 draws the card 2 sent out from the labeler 6 into the inside of the card holding part 15 and holds it.

After that, the carriage 17 is moved to the left direction so that the position of the card holding part 15 and the position of the card taking-out part 8 are coincided with each other in the right and left direction. After that, the drawing and sending-out mechanism 22 of the card holding part 15 sends out the card 2 to a rear side toward the card taking-out part 8, and the card 2 sent out is entered in the card taking-out part 8 formed in a box shape. In this case, when some error such as a recording error of magnetic data is generated during performing issue processing of the card 2, the card holding parts 15 and 16 are turned so that the rear end side of the card holding part 15 is inclined downward in a state that the position of the card holding part 15 and the position of the card taking-out part 8 are coincided with each other in the right and left direction. After that, the drawing and sending-out mechanism 22 of the card holding part 15 sends out the card 2 to an obliquely rear lower side toward the card collection part 9, and the card 2 sent out is entered in the card collection part 9 formed in a box shape.

As described above, in this embodiment, the drawing and sending-out mechanisms 22 of the card holding parts 15 and 16 draw a card 2 toward the insides of the card holding parts 15 and 16 to the front direction or to the rear direction. In other words, in this embodiment, the front and rear direction ("Y" direction) is a drawing direction of a card 2 to the card holding parts 15 and 16. Further, the drawing and sending-out mechanism 22 of the card holding part 16 sends out a card 2 from the inside of the card holding part 16 to a front direction, and the drawing and sending-out mechanism 22 of the card holding part 15 sends out a card 2 from the inside of the card holding part 15 to a front direction or a rear direction except a case sending out a card 2 to the card collection part 9.

Principal Effects in this Embodiment

As described above, the card conveying mechanism 10 in this embodiment includes the carriage drive mechanism 18 structured to linearly move the carriage 17 on which the card holding parts 15 and 16 are mounted in the right and left direction. Further, the card conveying mechanism 10 includes the turning mechanism 24 structured to turn the card holding parts 15 and 16 with respect to the carriage 17 with the right and left direction as an axial direction of turning, and the card holding parts 15 and 16 are capable of turning by 180° with the turnable shafts 33 as turning centers. Therefore, in this embodiment, a card 2 held by the card holding parts 15 and 16 is capable of being conveyed in the right and left direction, and a card 2 held by the card holding parts 15 and 16 is capable of setting to be parallel to the horizontal direction and being inclined with respect to the horizontal direction. Further, in this embodiment, the card holding parts 15 and 16 mounted on the carriage 17 are linearly moved in the right and left direction and are turned with the right and left direction as an axial direction of turning. Therefore, in comparison with a case that a card holding part linearly moved in the right and left direction and a card holding part turned with the right and left direction as an axial direction of turning are separately provided from each other like the card issuing device described in Patent Literature 1, the size of the card conveying mechanism 10 can be made small and an installation area of the card conveying mechanism 10 can be reduced. Accordingly, in this embodiment, even when a card 2 can be conveyed in the right and left direction and a card 2 can be set in parallel to the horizontal direction or inclined with respect to the horizontal direction, an installation area of the card issuing device 1 on which the card conveying mechanism 10 is mounted can be reduced. Further, in this embodiment, the card holding parts 15 and 16 can be turned with respect to the carriage 17 while the carriage 17 is linearly moved in the right and left direction and thus a time for performing issue processing of a card 2 can be shortened.

In this embodiment, the card holding part 15 and the card holding part 16 are disposed so as to overlap with each other in the upper and lower direction and, when the card holding parts 15 and 16 are turned to the state shown in FIG. 8(A), a card 2 can be transferred between the card holding part 15 and the card holding part 16 in the upper and lower direction. Therefore, according to this embodiment, a card 2 can be conveyed in the card conveying mechanism 10 in the upper and lower direction. Accordingly, in this embodiment, even when the card readers 3 and 4 and the printer 5 and the labeler 6 are disposed so as to overlap in the upper and lower direction and, even when two card accommodation parts 7, the card taking-out part 8 and the card collection part 9 and three card accommodation parts 7 are disposed so as to overlap in the upper and lower direction, a card 2 sent out from the card accommodation part 7 can be conveyed between the card readers 3 and 4, the printer 5 and the labeler 6 by the card conveying mechanism 10 and can be sent to the insides of the card taking-out part 8 and the card collection part 9.

In this embodiment, two card holding parts 15 and 16 are mounted on the common carriage 17. Therefore, according to this embodiment, in comparison with a case that carriages on which two card holding parts 15 and 16 are respectively mounted are individually provided, the structure of the card conveying mechanism 10 can be simplified.

In this embodiment, when one motor 71 is rotated, two card holding parts 15 and 16 are turned together in the same direction. Therefore, according to this embodiment, in comparison with a case that a motor for turning the card holding part 15 and a motor for turning the card holding part 16 are individually provided, the structure of the turning mechanism 24 can be simplified. Further, according to this embodiment, alignment of the card holding part 15 with the card holding part 16 can be performed by controlling one motor 71 when a card 2 is transferred between the card holding part 15 and the card holding part 16 in the upper and lower direction. Therefore, the card conveying mechanism 10 is easily controlled when a card 2 is conveyed in the upper and lower direction.

In this embodiment, when one motor 52 is rotated, the drawing and sending-out mechanism 22 of the card holding part 15 and the drawing and sending-out mechanism 22 of the card holding part 16 perform an drawing operation of a card 2 or an sending-out operation of a card 2. Therefore, according to this embodiment, in comparison with a case that a motor for driving the drawing and sending-out mechanism 22 of the card holding part 15 and a motor for driving the drawing and sending-out mechanism 22 of the card holding part 16 are individually provided, a structure of the drawing and sending-out drive mechanism 23 can be simplified. Further, in this embodiment, a sending-out operation of a card 2 by the drawing and sending-out mechanism 22 of the card holding part 15 can be easily synchronized with a drawing operation of the card 2 by the drawing and sending-out mechanism 22 of the card holding part 16. Further, a sending-out operation of a card 2 by the drawing and sending-out mechanism 22 of the card holding part 16 can be easily synchronized with a drawing operation of the card 2 by the drawing and sending-out mechanism 22 of the card holding part 15. Therefore, when performing transfer of a card 2 between the card holding part 15 and the card holding part 16 in the upper and lower direction, a card 2 can be easily and smoothly transferred between the card holding part 15 and the card holding part 16.

In this embodiment, the pulleys 54, the belt 62 and the gears 55, 63 and 64 structuring the drawing and sending-out drive mechanism 23 and the pulleys 73 and the belt 78 structuring the turning mechanism 24 are disposed on the right side with respect to the card holding parts 15 and 16. Therefore, according to this embodiment, for example, in comparison with a case that the pulleys 54, the belt 62 and the gears 55, 63 and 64 are disposed on the right side with respect to the card holding parts 15 and 16, and that the pulleys 73 and the belt 78 are disposed on the left side with respect to the card holding parts 15 and 16, maintenance of the card conveying mechanism 10 is easily performed.

In this embodiment, when viewed in the right and left direction, the card holding part 15 and the second card holding part 16 are point-symmetrically disposed and the gear train 56 rotatably held by the card holding part 15 and the gear train 56 rotatably held by the card holding part 16 are point-symmetrically disposed with respect to the midpoint "C" of an imaginary line "L" obtained by connecting the turning center of the card holding part 15 with the turning center of the card holding part 16. Therefore, according to this embodiment, even when the pulleys 54, the belt 62 and the gears 55, 63 and 64 structuring the drawing and sending-out drive mechanism 23 and the pulleys 73 and the belt 78 structuring the turning mechanism 24 are disposed on the right side with respect to the card holding parts 15 and 16 and, even when the card holding part 15 and the card holding part 16 are formed in the same shape as each other in a state that the gear train 56 is attached, an interference of the gear train 56 with the belt 78 can be prevented when the card holding parts 15 and 16 are turned.

In this embodiment, power of the motor 52 is transmitted to the pulley 61 through the power transmission shaft 53 rotatably supported by the support frame 21 and the motor 52 is fixed to the support frame 21. Further, power of the motor 71 is transmitted to the pulley 77 through the power transmission shaft 72 rotatably supported by the support frame 21 and the motor 71 is fixed to the support frame 21. In other words, in this embodiment, the motors 52 and 71 are not mounted on the carriage 17. Therefore, according to this embodiment, cables for supplying electric power to the motors 52 and 71 and controlling the motors 52 and 71 are not required to be led out from the carriage 17. Accordingly, in this embodiment, leading-around processing of cables connected with the motors 52 and 71 can be performed easily.

In this embodiment, the guide shaft 19 is supported in portions on an upper end side and a rear end side of two side plates 26, and the power transmission shaft 72 is adjacently disposed to an obliquely front upper side of the guide shaft 19 and is turnably supported by the portions on the upper end side and the rear end side of two side plates 26. Further, the guide shaft 20 is supported in a lower end side portion of two side plates 26 and the power transmission shaft 53 is turnably supported by a lower end side portion of the two side plates 26. Therefore, according to this embodiment, even in a case that the card readers 3 and 4, the printer 5, the labeler 6 and the card accommodation parts 7 are disposed around the card conveying mechanism 10, when performing maintenance of the card conveying mechanism 10, the card readers 3 and 4, the printer 5, the labeler 6 and the card accommodation parts 7, an operator can easily put his/her hand in toward a lower end side of the card conveying mechanism 10 from an upper side of the card conveying mechanism 10. Accordingly, in this embodiment, maintenance of the card conveying mechanism 10, the card readers 3 and 4, the printer 5, the labeler 6 and the card accommodation parts 7 can be performed easily.

In this embodiment, the card reader 3 and the card reader 4 designed to perform recording and/or reading of magnetic data to and/or from the magnetic stripes $2b$ and $2d$ specified in JIS standard "JISX6302-2" are disposed so that their postures in the front and rear direction are reversed each other. Further, reading of magnetic data recorded in the magnetic stripes $2b$ and $2d$ and/or recording of magnetic data to the magnetic stripes $2b$ and $2d$ are performed by magnetic heads of the card reader 3, and reading of magnetic data recorded in the magnetic stripe $2e$ and/or recording of magnetic data to the magnetic stripe $2e$ are performed by a magnetic head of the card reader 4. Therefore, according to this embodiment, even when magnetic data can be recorded and/or read to and/or from a so-called double stripe type card 2, a dedicated card reader is not required to prepare for performing recording and/or reading of magnetic data to the magnetic stripe $2e$. Further, in this embodiment, recording and/or reading of magnetic data can be performed to and/or from a double stripe type card 2 by selecting a conveyance destination of the card 2 by the card conveying mechanism 10.

Other Embodiments

Although the present invention has been shown and described with reference to a specific embodiment, various changes and modifications will be apparent to those skilled in the art from the teachings herein.

In the embodiment described above, the card issuing device 1 includes the card reader 4 and the labeler 6 but the card issuing device 1 may include no card reader 4 and no labeler 6. In this case, the card reader 4 and the labeler 6 may be detached as they are from the card issuing device 1 in the embodiment described above, but the card reader 3 and the printer 5 may be disposed so as to be adjacent to each other in the right and left direction. Alternatively, in this case, the printer 5 may be disposed on an upper side of the card reader 3 so that the card reader 3 and the printer 5 are overlapped with each other in the upper and lower direction.

Figure 9:
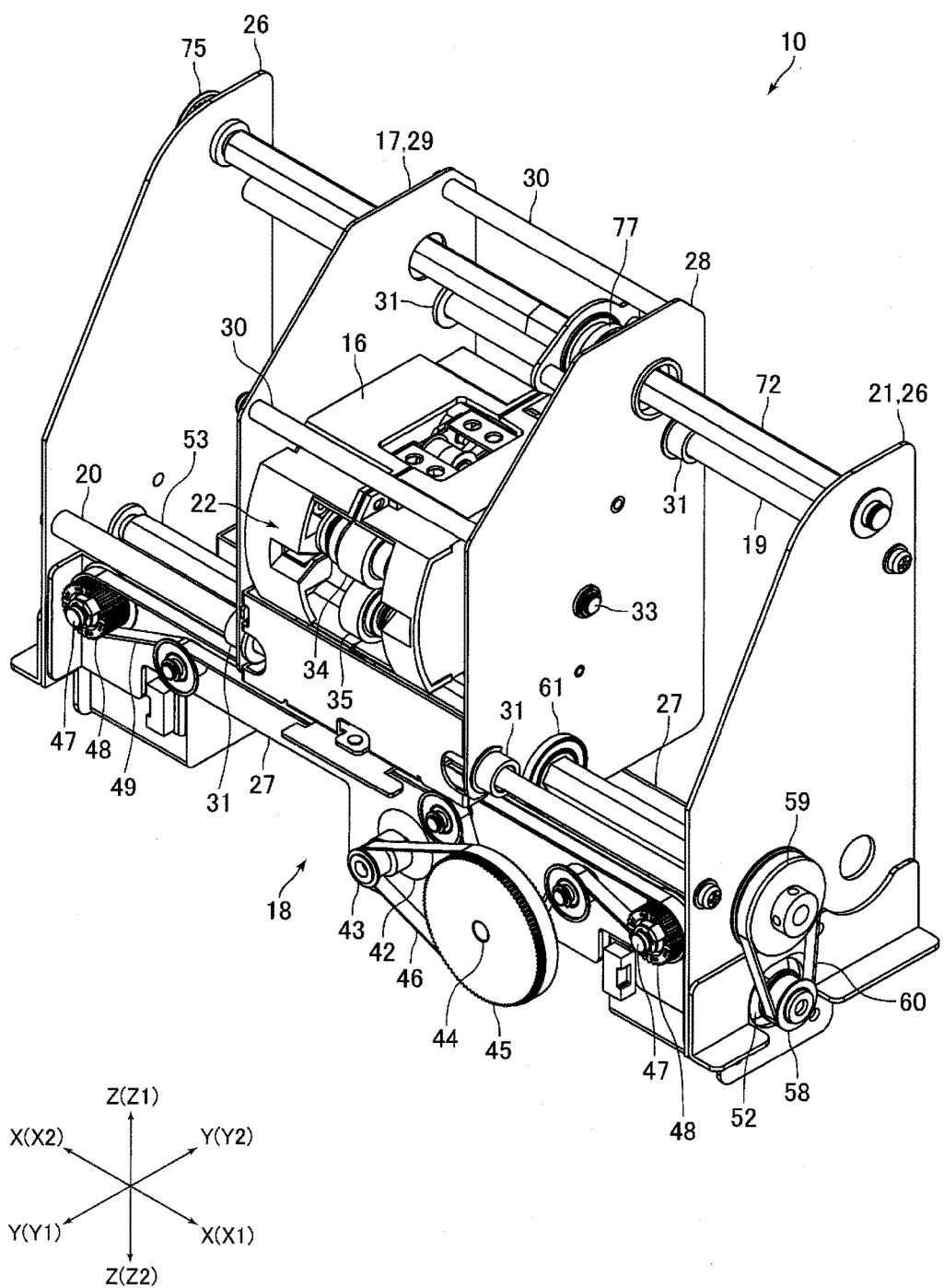
FIG. 9 is a perspective view showing a card conveying mechanism in accordance with another embodiment of the present invention.

In a case that the card reader 3 and the printer 5 are disposed so as to be adjacent to each other in the right and left direction, for example, the printer 5 is disposed at the position where the card reader 4 is disposed in the embodiment described above and two card accommodation parts 7 and the card taking-out part 8 and the card collection part 9 overlapped with each other in the upper and lower direction are disposed so as to be adjacent to each other in the right and left direction at the position where three card accommodation parts 7 are disposed so as to be adjacent to each other in the embodiment described above. In other words, the card issuing device 1 is structured as a so-called one story structure. In this case, as shown in FIG. 9, one card holding part 16 is mounted on the carriage 17 and the card conveying mechanism 10 conveys a card 2 sent out from the card accommodation part 7 between the card reader 3 and the printer 5 and, after processing in the card reader 3 and the printer 5 is finished, the card 2 is sent to the card taking-out part 8 or the card collection part 9. Further, when performing printing on both faces of a card 2 by the printer 5, the card conveying mechanism 10 turns the card holding part 16 so that the front and back faces of the card 2 are reversed. In a case that the card reader 3 and the printer 5 are adjacently disposed to each other in the right and left direction, a height of the card issuing device 1 can be set low. In FIG. 9, the same reference signs are used in the same structure as the embodiment described above.

In a case that the printer 5 is disposed on an upper side of the card reader 3, the card issuing device 1 includes, for example, three card accommodation parts 7, and two of the three card accommodation parts 7 are disposed so as to be adjacent to each other in the right and left direction. Further, remaining one card accommodation part 7 and the card taking-out part 8 and the card collection part 9 overlapped in the upper and lower direction are disposed on an upper side of the two card accommodation parts 7. In this case, a width of the card issuing device 1 in the right and left direction can be narrowed.

In the embodiment described above, the card issuing device 1 is structured as a two-story structure, but the card issuing device 1 may be structured as an "N"-story structure ("N" is an integer not less than 3) such as a three-story structure. In this case, "N" pieces of the card holding part which are disposed so as to be overlapped in the upper and lower direction are mounted on the carriage 17.

In the embodiment described above, in the upper and lower direction, an axial distance between the turnable shaft 33 fixed to the card holding part 15 and the turnable shaft 33 fixed to the card holding part 16 is set so that a card 2 can be directly transferred between the card holding part 15 and the card holding part 16. However, the present invention is not limited to this embodiment. For example, an axial distance between the turnable shaft 33 fixed to the card holding part 15 and the turnable shaft 33 fixed to the card holding part 16 may be set longer than a length that a card 2 can be directly transferred between the card holding part 15 and the card holding part 16. In this case, a drive roller and the like for conveying a card 2 may be disposed between the card holding part 15 and the card holding part 16 in the upper and lower direction so that a card 2 can be transferred between the card holding part 15 and the card holding part 16 in the upper and lower direction.

In the embodiment described above, the card holding parts 15 and 16 are capable of turning by 180° from a state that the card conveying passage 32 are parallel to the horizontal direction to a state that the card conveying passage 32 is vertically reversed with the turnable shaft 33 as a center. However, the present invention is not limited to this embodiment. For example, the card holding parts 15 and 16 may be turned by 90° from the state that the card conveying passage 32 is parallel to the horizontal direction with the turnable shaft 33 as a center. In this case, although the front and back faces of a card 2 is unable to be vertically reversed but a card 2 can be conveyed in the upper and lower direction.

In the embodiment described above, power of the motor 52 is transmitted to the power transmission shaft 53 by the pulleys 58 and 59 and the belt 60. However, power of the motor 52 may be transmitted to the power transmission shaft 53 by a gear train. Further, in the embodiment described above, power transmitted to the power transmission shaft 53 is transmitted to the gear 55 by two pulleys 54, the pulley 61 and the belt 62, but power transmitted to the power transmission shaft 53 may be transmitted to the gear 55b by a gear train. In addition, in the embodiment described above, power transmitted to the pulley 54 is transmitted to the drawing and sending-out mechanism 22 by the gear 55 and the gear train 56. However, power transmitted to the pulley 54 may be transmitted to the drawing and sending-out mechanism 22 by a pulley and a belt. Further, the drawing and sending-out mechanism 22 includes the pulley 37 and the belt 38 but may include a gear train instead of the pulley 37 and the belt 38.

In the embodiment described above, power of the motor 71 is transmitted to the power transmission shaft 72 by the pulleys 74 and 75 and the belt 76. However, power of the motor 71 may be transmitted to the power transmission shaft 72 by a gear train. Further, in the embodiment described above, power transmitted to the power transmission shaft 72 is transmitted to the card holding parts 15 and 16 by two pulleys 73, the pulley 77 and the belt 78. However, power transmitted to the power transmission shaft 72 may be transmitted to the card holding parts 15 and 16 by a gear train.

In the embodiment described above, the pulleys 54, the belt 62 and the gears 55, 63 and 64 structuring the drawing and sending-out drive mechanism 23 and the pulleys 73 and the belt 78 structuring the turning mechanism 24 are disposed on the right side with respect to the card holding parts 15 and 16. However, the present invention is not limited to this embodiment. For example, it may be structured that the pulleys 54, the belt 62 and the gears 55, 63 and 64 are disposed on one of the right side and the left side with respect to the card holding parts 15 and 16 and that the pulleys 73 and the belt 78 are disposed on the other of the right side and the left side with respect to the card holding parts 15 and 16. In this case, the card holding part 15 and the card holding part 16 may not be disposed point-symmetrically with respect to the midpoint "C" of the imaginary line "L". Further, in this case, the gear train 56 rotatably held by the card holding part 15 and the gear train 56 rotatably held by the card holding part 16 may not be disposed point-symmetrically with respect to the midpoint "C".

In the embodiment described above, two card holding parts 15 and 16 are mounted on the common carriage 17. However, a carriage on which the card holding part 15 is mounted and a carriage on which the card holding part is mounted may be provided individually. Further, in the embodiment described above, the drawing and sending-out mechanism 22 of the card holding part 15 and the drawing and sending-out mechanism 22 of the card holding part 16 are operated by one motor 52. However, a motor for operating the drawing and sending-out mechanism 22 of the card holding part 15 and a motor for operating the drawing and sending-out mechanism 22 of the card holding part 16 may be provided individually. Similarly, in the embodiment described above, two card holding parts 15 and 16 are turned by one motor 71. However, a motor for turning the card holding part 15 and a motor for turning the card holding part 16 may be provided individually. In this case, the card holding part 15 and the card holding part 16 may not be disposed point-symmetrically with respect to the midpoint "C" of the imaginary line "L". Further, in this case, the gear train 56 rotatably held by the card holding part 15 and the gear train 56 rotatably held by the card holding part 16 may not be disposed point-symmetrically with respect to the midpoint "C".

In the embodiment described above, the motor 52 is not mounted on the carriage 17 but the motor 52 may be mounted on the carriage 17. Similarly, the motor 71 is not mounted on the carriage 17 but the motor 71 may be mounted on the carriage 17. Further, in the embodiment described above, the card holding part 15 and the card holding part 16 are formed in the same shape as each other, but the shape of the card holding part 15 and the shape of the card holding part 16 may be different from each other. Further, in the embodiment described above, the power transmission shafts 53 and 72 are formed in a hexagonal columnar shape. However, the power transmission shafts 53 and 72 may be formed in a polygonal columnar shape such as a rectangular columnar shape or an octagonal columnar shape other than a hexagonal columnar shape.

In the embodiment described above, the drawing and sending-out mechanism 22 includes the drive roller 34 and the pad roller 35. However, the drawing and sending-out mechanism 22 may include a belt for drawing or sending a card 2 in or out instead of the drive roller 34 and the pad roller 35. Further, in the embodiment described above, the carriage moving mechanism 18 includes the belt 49 and the carriage 17 is moved in the right and left direction by the belt 49. However, the carriage moving mechanism 18 may move the carriage 17 in the right and left direction by a ball screw or the like.

In the embodiment described above, the printer 5 and the labeler 6 are disposed on an upper side of the card readers 3 and 4. However, the present invention is not limited to this embodiment. For example, the card readers 3 and 4 may be disposed on an upper side of the printer 5 and the labeler 6. Further, in the embodiment described above, the card conveying mechanism 10 is mounted on the card issuing device 1. However, the card conveying mechanism 10 may be mounted on a host apparatus other than the card issuing device 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card conveying mechanism for use with a card, the card conveying mechanism comprising:
    a card holding part comprising a drawing and sending-out mechanism structured to perform drawing and sending out of the card, the card holding part being configured to temporarily hold the card in an inside of the card holding part;
    a drawing and sending-out drive mechanism structured to drive the drawing and sending-out mechanism;
    a carriage on which the card holding part is mounted;
    a carriage drive mechanism structured to linearly move the carriage in a horizontal direction which is perpendicular to a drawing direction of the card to the card holding part; and
    a turning mechanism structured to turn the card holding part with respect to the carriage with a moving direction of the carriage as an axial direction of turning.

2. The card conveying mechanism according to claim 1, wherein
    the card holding part comprises two or more card holding parts which are disposed so as to overlap with each other in an upper and lower direction, and
    when the card holding parts are turned to predetermined positions by the turning mechanism, the card transferred between the card holding parts in the upper and lower direction.

3. The card conveying mechanism according to claim 2, wherein the two or more card holding parts are mounted on a common carriage so as to overlap in the upper and lower direction.

4. The card conveying mechanism according to claim 3, wherein
    the card holding parts comprise a first card holding part and a second card holding part,
    the turning mechanism comprises one turning motor which is a drive source, and
    when the turning motor is rotated, the first card holding part and the second card holding part are turned together.

5. The card conveying mechanism according to claim 4, wherein
    the turning mechanism comprises:
        a first turning pulley which is fixed to a turnable shaft fixed to the first card holding part;
        a second turning pulley which is fixed to a turnable shaft fixed to the second card holding part; and
        a turning belt which is stretched over the first turning pulley and the second turning pulley;
    wherein when the turning motor is rotated, the turning belt is turned and thereby the first card holding part and the second card holding part are turned together.

6. The card conveying mechanism according to claim 3, wherein
    the card holding parts comprise a first card holding part and a second card holding part,
    the first card holding part comprises a first drawing and sending-out mechanism as the drawing and sending-out mechanism,
    the second card holding part comprises a second drawing and sending-out mechanism as the drawing and sending-out mechanism,
    the drawing and sending-out drive mechanism comprises one drawing and sending-out motor which is a drive source,
    when the drawing and sending-out motor is rotated, the first drawing and sending-out mechanism and the second drawing and sending-out mechanism perform a drawing operation or a sending-out operation of the card.

7. The card conveying mechanism according to claim 6, wherein
    the drawing and sending-out drive mechanism comprises:
        a first drawing and sending-out pulley with which the first drawing and sending-out mechanism is connected;
        a second drawing and sending-out pulley with which the second drawing and sending-out mechanism is connected; and
        a drawing and sending-out belt which is stretched over the first drawing and sending-out pulley and the second drawing and sending-out pulley;
    when the drawing and sending-out motor is rotated, the drawing and sending-out belt is turned and thereby the first drawing and sending-out mechanism and the second drawing and sending-out mechanism perform the drawing operation or the sending-out operation of the card.

8. The card conveying mechanism according to claim 7, wherein the drawing and sending-out drive mechanism comprises:
- a first gear which is coaxially disposed with the first drawing and sending-out pulley and is rotated together with the first drawing and sending-out pulley;
- a first gear train which is disposed between the first gear and the first drawing and sending-out mechanism and is engaged with the first gear in a transmission path of power from the drawing and sending-out motor to the first drawing and sending-out mechanism;
- a second gear which is coaxially disposed with the second drawing and sending-out pulley and is rotated together with the second drawing and sending-out pulley; and
- a second gear train which is disposed between the second gear and the second drawing and sending-out mechanism and is engaged with the second gear in a transmission path of power from the drawing and sending-out motor to the second drawing and sending-out mechanism;

the turning mechanism comprises:
- one turning motor which is a drive source;
- a first turning pulley which is fixed to a turnable shaft fixed to the first card holding part;
- a second turning pulley which is fixed to a turnable shaft fixed to the second card holding part; and
- a turning belt which is stretched over the first turning pulley and the second turning pulley;

when the turning motor is rotated, the turning belt is turned and thereby the first card holding part and the second card holding part are turned together, the first drawing and sending-out pulley and the first turning pulley are coaxially disposed with each other, the second drawing and sending-out pulley and the second turning pulley are coaxially disposed with each other, when one side in a moving direction of the carriage is referred to as a first direction, the first drawing and sending-out pulley, the second drawing and sending-out pulley, the drawing and sending-out belt, the first gear, the first gear train, the second gear, the second gear train, the first turning pulley, the second turning pulley and the turning belt are disposed on a first direction side with respect to the first card holding part and the second card holding part in the moving direction of the carriage, gears structuring the first gear train are rotatably held by the first card holding part, gears structuring the second gear train are rotatably held by the second card holding part, and when viewed in the moving direction of the carriage, the first card holding part and the second card holding part are point-symmetrically disposed and the first gear train and the second gear train are point-symmetrically disposed with respect to a midpoint of an imaginary line obtained by connecting a turning center of the first card holding part with a turning center of the second card holding part.

9. The card conveying mechanism according to claim 1, further comprising:
- a guide shaft which guides the carriage in the moving direction of the carriage; and
- a support frame which supports both end sides of the guide shaft, wherein the drawing and sending-out drive mechanism comprises:
- a drawing and sending-out motor which is fixed to the support frame;
- a drawing and sending-out power transmission shaft formed in a polygonal columnar shape whose both end sides in the moving direction of the carriage are rotatably supported by the support frame;
- a first drawing and sending-out power transmission mechanism structured to transmit power of the drawing and sending-out motor to the drawing and sending-out power transmission shaft to rotate the drawing and sending-out power transmission shaft; and
- a second drawing and sending-out power transmission mechanism structured to transmit power transmitted to the drawing and sending-out power transmission shaft to the drawing and sending-out mechanism, wherein the turning mechanism comprises:
- a turning motor which is fixed to the support frame;
- a turning power transmission shaft formed in a polygonal-column shape whose both end sides in the moving direction of the carriage are rotatably supported by the support frame;
- a first turning power transmission mechanism structured to transmit power of the turning motor to the turning power transmission shaft to rotate the turning power transmission shaft; and
- a second turning power transmission mechanism structured to transmit power transmitted to the turning power transmission shaft to the card holding part.

10. The card conveying mechanism according to claim 9, wherein the guide shaft comprises:
- a first guide shaft which is supported in an upper end side portion of the support frame; and
- a second guide shaft supported in a lower end side portion of the support frame, when a direction perpendicular to the moving direction of the carriage and an upper and lower direction is referred to as a second direction, the first guide shaft is supported in a portion on one side in the second direction of the support frame, one of the drawing and sending-out power transmission shaft and the turning power transmission shaft is rotatably supported in a lower end side portion of the support frame, and the other of the drawing and sending-out power transmission shaft and the turning power transmission shaft is rotatably supported in a portion of the support frame on an upper end side and one side in the second direction.

11. The card conveying mechanism according to claim 9, wherein the card holding part comprises two or more card holding parts which are disposed so as to overlap with each other in an upper and lower direction, and when the card holding parts are turned to predetermined positions by the turning mechanism, the card is transferred between the card holding parts in the upper and lower direction.

12. The card conveying mechanism according to claim 11, wherein the two or more card holding parts comprise a first card holding part and a second card holding part which are mounted on a common carriage so as to overlap in the upper and lower direction, when the turning motor is rotated, the first card holding part and the second card holding part are turned together.

13. The card conveying mechanism according to claim 12, wherein
the first card holding part comprises a first drawing and sending-out mechanism as the drawing and sending-out mechanism,
the second card holding part comprises a second drawing and sending-out mechanism as the drawing and sending-out mechanism, and
when the drawing and sending-out motor is rotated, the first drawing and sending-out mechanism and the second drawing and sending-out mechanism perform a drawing operation or a sending-out operation of the card.

14. A card issuing device comprising:
a card conveying mechanism comprising:
  a card holding part comprising a drawing and sending-out mechanism structured to perform drawing and sending out a card, the card holding part being configured to temporarily hold the card in its inside;
  a drawing and sending-out drive mechanism structured to drive the drawing and sending-out mechanism;
  a carriage on which the card holding part is mounted;
  a carriage drive mechanism structured to linearly move the carriage in a horizontal direction which is perpendicular to a drawing direction of the card to the card holding part; and
  a turning mechanism structured to turn the card holding part with respect to the carriage with a moving direction of the carriage as an axial direction of turning;
a card accommodation part in which cards before issue are accommodated; and
a card taking-out part configured to take out the card to be issued.

15. The card issuing device according to claim 14, wherein
the card conveying mechanism comprises the card holding part comprising two or more card holding parts which are disposed so as to overlap with each other in an upper and lower direction, and
when the card holding parts are turned to predetermined positions by the turning mechanism, the card is capable of being transferred between the card holding parts in the upper and lower direction.

16. The card issuing device according to claim 15, wherein
the two or more card holding parts comprise a first card holding part and a second card holding part which are mounted on a common carriage so as to overlap in the upper and lower direction,
the turning mechanism comprises one turning motor which is a drive source, and
when the turning motor is rotated, the first card holding part and the second card holding part are turned together.

17. The card issuing device according to claim 16, wherein
the turning mechanism comprises:
  a first turning pulley which is fixed to a turnable shaft fixed to the first card holding part;
  a second turning pulley which is fixed to a turnable shaft fixed to the second card holding part; and
  a turning belt which is stretched over the first turning pulley and the second turning pulley;
wherein when the turning motor is rotated, the turning belt is turned and thereby the first card holding part and the second card holding part are turned together.

18. The card issuing device according to claim 16, wherein
the first card holding part comprises a first drawing and sending-out mechanism as the drawing and sending-out mechanism,
the second card holding part comprises a second drawing and sending-out mechanism as the drawing and sending-out mechanism, and
the drawing and sending-out drive mechanism comprises one drawing and sending-out motor which is a drive source,
when the drawing and sending-out motor is rotated, the first drawing and sending-out mechanism and the second drawing and sending-out mechanism perform a drawing operation or a sending-out operation of the card.

19. The card issuing device according to claim 18, wherein
the drawing and sending-out drive mechanism comprises:
  a first drawing and sending-out pulley with which the first drawing and sending-out mechanism is connected;
  a second drawing and sending-out pulley with which the second drawing and sending-out mechanism is connected; and
  a drawing and sending-out belt which is stretched over the first drawing and sending-out pulley and the second drawing and sending-out pulley;
when the drawing and sending-out motor is rotated, the drawing and sending-out belt is turned and thereby the first drawing and sending-out mechanism and the second drawing and sending-out mechanism perform the drawing operation or the sending-out operation of the card.

20. The card issuing device according to claim 19, wherein
the drawing and sending-out drive mechanism comprises:
  a first gear which is coaxially disposed with the first drawing and sending-out pulley and is rotated together with the first drawing and sending-out pulley;
  a first gear train which is disposed between the first gear and the first drawing and sending-out mechanism and is engaged with the first gear in a transmission path of power from the drawing and sending-out motor to the first drawing and sending-out mechanism;
  a second gear which is coaxially disposed with the second drawing and sending-out pulley and is rotated together with the second drawing and sending-out pulley; and
  a second gear train which is disposed between the second gear and the second drawing and sending-out mechanism and is engaged with the second gear in a transmission path of power from the drawing and sending-out motor to the second drawing and sending-out mechanism;
the turning mechanism comprises:
  one turning motor which is a drive source;
  a first turning pulley which is fixed to a turnable shaft fixed to the first card holding part;
  a second turning pulley which is fixed to a turnable shaft fixed to the second card holding part; and
  a turning belt which is stretched over the first turning pulley and the second turning pulley;

when the turning motor is rotated, the turning belt is turned and thereby the first card holding part and the second card holding part are turned together, the first drawing and sending-out pulley and the first turning pulley are coaxially disposed with each other, the second drawing and sending-out pulley and the second turning pulley are coaxially disposed with each other, when one side in a moving direction of the carriage is referred to as a first direction, the first drawing and sending-out pulley, the second drawing and sending-out pulley, the drawing and sending-out belt, the first gear, the first gear train, the second gear, the second gear train, the first turning pulley, the second turning pulley and the turning belt are disposed on a first direction side with respect to the first card holding part and the second card holding part in the moving direction of the carriage, gears structuring the first gear train are rotatably held by the first card holding part, gears structuring the second gear train are rotatably held by the second card holding part, and when viewed in the moving direction of the carriage, the first card holding part and the second card holding part are point-symmetrically disposed and the first gear train and the second gear train are point-symmetrically disposed with respect to a midpoint of an imaginary line obtained by connecting a turning center of the first card holding part with a turning center of the second card holding part.

21. The card issuing device according to claim 14, wherein the card conveying mechanism further comprises:
a guide shaft which guides the carriage in the moving direction of the carriage; and
a support frame which supports both end sides of the guide shaft, the drawing and sending-out drive mechanism comprises:
a drawing and sending-out motor which is fixed to the support frame;
a drawing and sending-out power transmission shaft formed in a polygonal columnar shape whose both end sides in the moving direction of the carriage are rotatably supported by the support frame;
a first drawing and sending-out power transmission mechanism structured to transmit power of the drawing and sending-out motor to the drawing and sending-out power transmission shaft to rotate the drawing and sending-out power transmission shaft; and
a second drawing and sending-out power transmission mechanism structured to transmit power transmitted to the drawing and sending-out power transmission shaft to the drawing and sending-out mechanism, wherein the turning mechanism comprises:
a turning motor which is fixed to the support frame;
a turning power transmission shaft formed in a polygonal-column shape whose both end sides in the moving direction of the carriage are rotatably supported by the support frame;
a first turning power transmission mechanism structured to transmit power of the turning motor to the turning power transmission shaft to rotate the turning power transmission shaft; and
a second turning power transmission mechanism structured to transmit power transmitted to the turning power transmission shaft to the card holding part.

22. The card issuing device according to claim 21, wherein the guide shaft comprises:
a first guide shaft which is supported in an upper end side portion of the support frame; and
a second guide shaft supported in a lower end side portion of the support frame, when a direction perpendicular to the moving direction of the carriage and an upper and lower direction is referred to as a second direction, the first guide shaft is supported in a portion on one side in the second direction of the support frame, one of the drawing and sending-out power transmission shaft and the turning power transmission shaft is rotatably supported in a lower end side portion of the support frame, and the other of the drawing and sending-out power transmission shaft and the turning power transmission shaft is rotatably supported in a portion of the support frame on an upper end side and one side in the second direction.

* * * * *